United States Patent
Liu

(10) Patent No.: US 10,606,637 B2
(45) Date of Patent: Mar. 31, 2020

(54) TIME CORRECTION METHOD, APPARATUS, AND SYSTEM

(71) Applicant: Huawei Technologies Co., Ltd., Shenzhen (CN)

(72) Inventor: Tao Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 15/824,165

(22) Filed: Nov. 28, 2017

(65) Prior Publication Data

US 2018/0081714 A1 Mar. 22, 2018

Related U.S. Application Data

(63) Continuation of application No. PCT/CN2016/081869, filed on May 12, 2016.

(30) Foreign Application Priority Data

May 29, 2015 (CN) .......................... 2015 1 0290638

(51) Int. Cl.
  *G06F 15/16* (2006.01)
  *G06F 9/48* (2006.01)
  (Continued)

(52) U.S. Cl.
  CPC .............. *G06F 9/4856* (2013.01); *G06F 1/12* (2013.01); *G06F 1/14* (2013.01); *G06F 9/45558* (2013.01);
  (Continued)

(58) Field of Classification Search
  CPC ... H04L 29/08072; H04L 29/06; H04L 41/04; H04L 41/0672
  (Continued)

(56) References Cited

U.S. PATENT DOCUMENTS 10,114,565 B2 * 10/2018 Nithrakashyap .... G06F 11/1446
10,133,495 B2 * 11/2018 Jain ........................ G06F 3/0641
(Continued)

FOREIGN PATENT DOCUMENTS

CN 102662751 A 9/2012
CN 102934087 A 2/2013
(Continued)

OTHER PUBLICATIONS

Machine Translation and Abstract of Chinese Publication No. CN102662751, Sep. 12, 2012, 11 pages.
(Continued)

*Primary Examiner* — Khanh Q Dinh
(74) *Attorney, Agent, or Firm* — Conley Rose, P.C.

(57) ABSTRACT

A time correction method, apparatus, and system, and relate to the field of communications technologies are provided. A virtual network function manager (VNFM) receives a hot migration notification message from a virtualized infrastructure manager (VIM) after hot migration is performed on a first virtual machine, where the hot migration notification message includes an identity (ID) of the first virtual machine; the VNFM searches, according to the ID of the first virtual machine, for a correspondence that is between an ID of a virtual machine and an identity of a service control virtual network function (VNF) and stored in the VNFM, to determine a first service control VNF; and the VNFM sends the hot migration notification message to the first service control VNF, where the hot migration notification message is used to instruct the first service control VNF to correct a system time of the first virtual machine.

20 Claims, 15 Drawing Sheets

A VNFM receives a hot migration notification message sent by a VIM after hot migration is performed on a first virtual machine, where the hot migration notification message includes an ID of the first virtual machine — S101

The VNFM searches, according to the ID of the first virtual machine, for a correspondence that is between an ID of a virtual machine and an identity of a service control VNF and stored in the VNFM, to determine a first service control VNF — S102

The VNFM sends the hot migration notification message to the first service control VNF, where the hot migration notification message is used to instruct the first service control VNF to correct a system time of the first virtual machine — S103

(51) Int. Cl.
*G06F 1/12* (2006.01)
*H04L 29/08* (2006.01)
*G06F 1/14* (2006.01)
*G06F 9/455* (2018.01)
*H04L 12/24* (2006.01)
*H04L 29/06* (2006.01)

(52) U.S. Cl.
CPC .... *H04L 29/08072* (2013.01); *H04L 41/0806* (2013.01); *G06F 2009/4557* (2013.01); *H04L 29/06* (2013.01)

(58) Field of Classification Search
USPC .......................... 709/220, 224, 226, 228, 232
See application file for complete search history.

(56) References Cited

U.S. PATENT DOCUMENTS

| | | | |
|---|---|---|---|
| 10,241,495 B2* | 3/2019 | Hsu | G05B 19/401 |
| 10,282,112 B2* | 5/2019 | Jain | G06F 11/1451 |
| 10,374,887 B2* | 8/2019 | Kerpez | H04L 12/2894 |
| 2011/0047315 A1 | 2/2011 | De Dinechin et al. | |
| 2011/0289205 A1 | 11/2011 | Hansson et al. | |
| 2016/0124977 A1* | 5/2016 | Jain | G06F 16/84 707/649 |
| 2016/0124978 A1* | 5/2016 | Nithrakashyap | H04L 67/10 707/639 |
| 2016/0125059 A1* | 5/2016 | Jain | G06F 3/067 707/639 |
| 2017/0272311 A1* | 9/2017 | Kerpez | H04L 12/2878 |
| 2017/0279635 A1* | 9/2017 | Kerpez | H04L 12/2878 |
| 2018/0060135 A1* | 3/2018 | Lacey | H04W 24/02 |

FOREIGN PATENT DOCUMENTS

| | | |
|---|---|---|
| CN | 103885857 A | 6/2014 |
| CN | 104219107 A | 12/2014 |
| CN | 104869023 A | 8/2015 |

OTHER PUBLICATIONS

Machine Translation and Abstract of Chinese Publication No. CN103885857, Jun. 25, 2014, 24 pages.
Machine Translation and Abstract of Chinese Publication No. CN104219107, Dec. 17, 2014, 46 pages.
Machine Translation and Abstract of Chinese Publication No. CN104869023, Aug. 26, 2015, 58 pages.
Foreign Communication From A Counterpart Application, Chinese Application No. 201510290638.8, Chinese Office Action dated Aug. 30, 2017, 5 pages.
Foreign Communication From A Counterpart Application, PCT Application No. PCT/CN2016/081869, English Translation of International Search Report dated Jul. 21, 2016, 2 pages.
Foreign Communication From A Counterpart Application, PCT Application No. PCT/CN2016/081869, English Translation of Written Opinion dated Jul. 21, 2016, 7 pages.

* cited by examiner

TIME CORRECTION METHOD, APPARATUS, AND SYSTEM

CROSS-REFERENCE TO RELATED APPLICATIONS

This application is a continuation of International Application No. PCT/CN2016/081869, filed on May 12, 2016, which claims priority to Chinese Patent Application No. 201510290638.8, filed on May 29, 2015, both of which are hereby incorporated by reference in their entireties.

TECHNICAL FIELD

The present disclosure relates to the field of communications technologies, and in particular, to a time correction method, apparatus, and system.

BACKGROUND

With popularization of cloud technologies, the cloud technologies are used for increasingly more telecommunications-type services. Network functions virtualization (NFV) is a virtualization technology in the cloud technologies. In an NFV system, a virtualized network function (VNF) is instantiated, so that the VNF can run on a universal hardware device. Therefore, a specific network function is implemented using the universal hardware device.

In the NFV system, one VNF may be configured on one or more virtual machines. Hot migration is often performed on a virtual machine to satisfy different user requirements. Virtual machine hot migration refers to transferring, if a service is not interrupted, a virtual machine that runs on one hardware device to another hardware device for running. However, in a virtual machine hot migration process, a virtual machine stops running in an extremely short time. Consequently, a system time of the virtual machine pauses for a short time that is usually 0.5 to 0.8 second and sometimes reaches more than 1 second. In this way, a service depending on the system time of the virtual machine is affected.

In the prior art, an exterior Network Time Protocol (NTP) system time source is usually configured, and a system time of a virtual machine is periodically checked with the exterior NTP system time source, to correct the system time of the virtual machine. However, a problem exists in that generally, a period of periodically checking the system time of the virtual machine with the exterior NTP system time source is five minutes, 10 minutes, or a longer time, and the system time of the virtual machine is inaccurate in a period of time from a time at which the virtual machine stops running to a time at which the foregoing period expires. Therefore, a service that depends on the system time of the virtual machine and that is performed in the period of time is affected.

SUMMARY

Embodiments of the present disclosure provide a time correction method, apparatus, and system, so that a system time of a virtual machine can be corrected in time, so as to ensure that a service depending on the system time of the virtual machine is not affected.

To achieve the foregoing objective, the following technical solutions are used in the embodiments of the present disclosure.

A first aspect of the embodiments of the present disclosure provides a time correction method, where the time correction method is applied to a network functions virtualization NFV system and includes receiving, by a virtualized network function manager (VNFM), a hot migration notification message sent by a virtualized infrastructure manager (VIM) after hot migration is performed on a first virtual machine, where the hot migration notification message includes an identity (ID) of the first virtual machine, and the ID of the first virtual machine is used to indicate that a to-be-corrected virtual machine is the first virtual machine; searching, by the VNFM according to the ID of the first virtual machine, for a correspondence that is between an ID of a virtual machine and an identity of a service control virtualized network function VNF and stored in the VNFM, to determine a first service control VNF, where an identity of the first service control VNF is corresponding to the ID of the first virtual machine; and sending, by the VNFM, the hot migration notification message to the first service control VNF, where the hot migration notification message is used to instruct the first service control VNF to correct a system time of the first virtual machine.

With reference to the first aspect, in a first possible implementation manner of the first aspect, the hot migration notification message is used to instruct the first service control VNF to correct the system time of the first virtual machine according to a time of a NTP system time source.

With reference to the first aspect, in a second possible implementation manner of the first aspect, the hot migration notification message further includes virtual machine suspension duration, and the virtual machine suspension duration is duration in which the first virtual machine is not running in a hot migration process; and the hot migration notification message is used to instruct the first service control VNF to correct the system time of the first virtual machine according to the virtual machine suspension duration.

With reference to the first possible implementation manner of the first aspect, in a third possible implementation manner of the first aspect, the hot migration notification message further includes virtual machine suspension duration, and the virtual machine suspension duration is duration in which the first virtual machine is not running in a hot migration process; and the hot migration notification message is further used to instruct the first service control VNF to correct the system time of the first virtual machine according to the time of the NTP system time source, and correct the system time of the first virtual machine according to the virtual machine suspension duration when failing to correct the system time of the first virtual machine according to the time of the NTP system time source.

With reference to the first aspect and the foregoing possible implementation manners, in a fourth possible implementation manner of the first aspect, the hot migration notification message further includes a virtual machine suspension start time, and the virtual machine suspension start time is a start time at which the first virtual machine stops running in the hot migration process.

With reference to the first aspect and the foregoing possible implementation manners, in a fifth possible implementation manner of the first aspect, the receiving, by a virtualized network function manager VNFM, a hot migration notification message sent by a virtualized infrastructure manager VIM after hot migration is performed on a first virtual machine includes receiving, by the VNFM using a Vi-Vnfm interface, the hot migration notification message sent by the VIM after hot migration is performed on the first virtual machine; and the sending, by the VNFM, the hot migration notification message to the first service control VNF includes sending, by the VNFM, the hot migration notification message to the first service control VNF using a Ve-Vnfm interface.

A second aspect of the embodiments of the present disclosure provides a time correction method, where the time correction method is applied to a NFV system and includes receiving, by a first service control VNF after hot migration is performed on a first virtual machine, a hot migration notification message sent by a VNFM, where the first service control VNF is a service control VNF of the first virtual machine, the hot migration notification message includes an ID of the first virtual machine, and the ID of the first virtual machine is used to indicate that a to-be-corrected virtual machine is the first virtual machine; and correcting, by the first service control VNF, a system time of the first virtual machine.

With reference to the second aspect, in a first possible implementation manner of the second aspect, the correcting, by the first service control VNF, a system time of the first virtual machine includes obtaining, by the first service control VNF, a time of a NTP system time source, and correcting the system time of the first virtual machine to the time of the NTP system time source.

With reference to the second aspect, in a second possible implementation manner of the second aspect, the hot migration notification message further includes virtual machine suspension duration, and the virtual machine suspension duration is duration in which the first virtual machine is not running in a hot migration process; and the correcting, by the first service control VNF, a system time of the first virtual machine includes adding, by the first service control VNF, the virtual machine suspension duration to the system time of the first virtual machine, and using a system time obtained after the adding as a new system time of the first virtual machine.

With reference to the first possible implementation manner of the second aspect, in a third possible implementation manner of the second aspect, the hot migration notification message further includes virtual machine suspension duration, and the virtual machine suspension duration is duration in which the first virtual machine is not running in a hot migration process; and the correcting, by the first service control VNF, a system time of the first virtual machine includes obtaining, by the first service control VNF, a time of an NTP system time source; and adding, by the first service control VNF, the virtual machine suspension duration to the system time of the first virtual machine if the first service control VNF fails to obtain the time of the NTP system time source, and using a system time obtained after the adding as a new system time of the first virtual machine.

With reference to the second aspect and the foregoing possible implementation manners, in a fourth possible implementation manner of the second aspect, the hot migration notification message further includes a virtual machine suspension start time, the virtual machine suspension start time is a start time at which the first virtual machine stops running in the hot migration process, and the first service control VNF is a call control VNF; and the time correction method further includes determining, by the call control VNF according to the virtual machine suspension start time, a service that has not been finished at the virtual machine suspension start time and has been finished when the call control VNF receives the hot migration notification message; obtaining, by the call control VNF, total duration of the service; and adding, by the call control VNF, the virtual machine suspension duration to the total duration, and using duration obtained after the adding as new total duration of the service.

With reference to the fourth possible implementation manner of the second aspect, in a fifth possible implementation manner of the second aspect, the time correction method further includes sending, by the call control VNF, a hot migration charging compensation message to a charging control VNF, where the hot migration charging compensation message includes an identity of the service, the virtual machine suspension duration, and the virtual machine suspension start time, and the hot migration charging compensation message is used to instruct the charging control VNF to correct the total duration of the service and charge according to the corrected total duration of the service.

With reference to the second aspect and the foregoing possible implementation manners, in a sixth possible implementation manner of the second aspect, the receiving, by a first service control VNF after hot migration is performed on a first virtual machine, a hot migration notification message sent by a VNFM includes, after hot migration is performed on the first virtual machine, receiving, by the first service control VNF using a Ve-Vnfm interface, the hot migration notification message sent by the VNFM.

A third aspect of the embodiments of the present disclosure provides a time correction method, where the time correction method is applied to a NFV system and includes receiving, by a VIM after hot migration is performed on a first virtual machine, a virtual machine migration message sent by a network functions virtualization infrastructure (NFVI), where the virtual machine migration message includes an ID of the first virtual machine, and the ID of the first virtual machine is used to indicate that a to-be-corrected virtual machine is the first virtual machine; converting, by the VIM, the virtual machine migration message into a hot migration notification message, where the hot migration notification message includes the ID of the first virtual machine; and sending, by the VIM, the hot migration notification message to a VNFM, to instruct the VNFM to correct a system time of the first virtual machine using a service control VNF.

With reference to the third aspect, in a first possible implementation manner of the third aspect, the receiving, by a VIM after hot migration is performed on a first virtual machine, a virtual machine migration message sent by a NFVI includes, after hot migration is performed on the first virtual machine, receiving, by the VIM using an Nf-Vi interface, the virtual machine migration message sent by the NFVI; and the sending, by the VIM, the hot migration notification message to a VNFM includes sending, by the VIM, the hot migration notification message to the VNFM using a Vi-Vnfm interface.

A fourth aspect of the embodiments of the present disclosure provides a time correction method, where the time correction method is applied to a NFV system and includes obtaining, by a NFVI, virtual machine suspension duration after hot migration is performed on a first virtual machine, where the virtual machine suspension duration is duration in which the first virtual machine is not running in a hot migration process; obtaining, by the NFVI, a clock rate of a central processing unit (CPU) of the first virtual machine; calculating, by the NFVI, a count increased value of a time stamp counter (TSC) of the first virtual machine according to the clock rate of the CPU of the first virtual machine and the virtual machine suspension duration; and adding, by the NFVI, the count increased value to a TSC count value of the first virtual machine, and using a value obtained after the adding as a new TSC count value of the first virtual machine.

With reference to the fourth aspect, in a first possible implementation manner of the fourth aspect, the calculating, by the NFVI, a count increased value of a TSC of the first virtual machine according to the clock rate of the CPU of the first virtual machine and the virtual machine suspension duration includes calculating, by the NFVI, the count increased value according to the following formula:

Count increased value=Virtual machine suspension duration×Clock rate of the CPU of the first virtual machine/1000, where a unit of the virtual machine suspension duration is millisecond, and a unit of the clock rate of the CPU of the first virtual machine is hertz.

A fifth aspect of the embodiments of the present disclosure provides a time correction apparatus, where the time correction apparatus is applied to a NFV system and includes a receiving unit configured to receive a hot migration notification message sent by a virtualized infrastructure manager VIM after hot migration is performed on a first virtual machine, where the hot migration notification message includes an ID of the first virtual machine, and the ID of the first virtual machine is used to indicate that a to-be-corrected virtual machine is the first virtual machine; a determining unit configured to search, according to the ID of the first virtual machine, for a correspondence that is between an ID of a virtual machine and an identity of a service control VNF and stored in the VNFM, to determine a first service control VNF, where an identity of the first service control VNF is corresponding to the ID of the first virtual machine; and a sending unit configured to send the hot migration notification message to the first service control VNF, where the hot migration notification message is used to instruct the first service control VNF to correct a system time of the first virtual machine.

With reference to the fifth aspect, in a first possible implementation manner of the fifth aspect, the hot migration notification message is used to instruct the first service control VNF to correct the system time of the first virtual machine according to a time of a NTP system time source.

With reference to the fifth aspect, in a second possible implementation manner of the fifth aspect, the hot migration notification message further includes virtual machine suspension duration, and the virtual machine suspension duration is duration in which the first virtual machine is not running in a hot migration process; and the hot migration notification message is used to instruct the first service control VNF to correct the system time of the first virtual machine according to the virtual machine suspension duration.

With reference to the first possible implementation manner of the fifth aspect, in a third possible implementation manner of the fifth aspect, the hot migration notification message further includes virtual machine suspension duration, and the virtual machine suspension duration is duration in which the first virtual machine is not running in a hot migration process; and the hot migration notification message is further used to instruct the first service control VNF to correct the system time of the first virtual machine according to the time of the NTP system time source, and correct the system time of the first virtual machine according to the virtual machine suspension duration when failing to correct the system time of the first virtual machine according to the time of the NTP system time source.

With reference to the fifth aspect and the foregoing possible implementation manners, in a fourth possible implementation manner of the fifth aspect, the hot migration notification message further includes a virtual machine suspension start time, and the virtual machine suspension start time is a start time at which the first virtual machine stops running in the hot migration process.

With reference to the fifth aspect and the foregoing possible implementation manners, in a fifth possible implementation manner of the fifth aspect, the receiving unit is configured to receive, using a Vi-Vnfm interface, the hot migration notification message sent by the VIM after hot migration is performed on the first virtual machine; and the sending unit is configured to send the hot migration notification message to the first service control VNF using a Ve-Vnfm interface.

A sixth aspect of the embodiments of the present disclosure provides a time correction apparatus, where the time correction apparatus is applied to a NFV system and includes a receiving unit configured to receive, after hot migration is performed on a first virtual machine, a hot migration notification message sent by a VNFM, where the hot migration notification message includes an ID of the first virtual machine, and the ID of the first virtual machine is used to indicate that a to-be-corrected virtual machine is the first virtual machine; and a correction unit configured to correct a system time of the first virtual machine.

With reference to the sixth aspect, in a first possible implementation manner of the sixth aspect, the correction unit includes an obtaining submodule configured to obtain a time of a NTP system time source; and a correction submodule configured to correct the system time of the first virtual machine to the time of the NTP system time source.

With reference to the sixth aspect, in a second possible implementation manner of the sixth aspect, the hot migration notification message further includes virtual machine suspension duration, and the virtual machine suspension duration is duration in which the first virtual machine is not running in a hot migration process; and the correction unit includes an addition submodule configured to add the virtual machine suspension duration to the system time of the first virtual machine; and a correction submodule configured to use a system time obtained after the adding as a new system time of the first virtual machine.

With reference to the first possible implementation manner of the sixth aspect, in a third possible implementation manner of the sixth aspect, the hot migration notification message further includes virtual machine suspension duration, and the virtual machine suspension duration is duration in which the first virtual machine is not running in a hot migration process; the correction unit further includes an addition submodule configured to add the virtual machine suspension duration to the system time of the first virtual machine when the obtaining submodule fails to obtain the time of the NTP system time source; and the correction submodule is further configured to use a system time obtained after the adding as a new system time of the first virtual machine.

With reference to the sixth aspect and the foregoing possible implementation manners, in a fourth possible implementation manner of the sixth aspect, the hot migration notification message further includes a virtual machine suspension start time, the virtual machine suspension start time is a start time at which the first virtual machine stops running in the hot migration process, and the time correction apparatus is a call control VNF; the time correction apparatus further includes a determining unit configured to determine, according to the virtual machine suspension start time, a service that has not been finished at the virtual machine suspension start time and has been finished when the receiving unit receives the hot migration notification message; an obtaining unit configured to obtain total duration of the service; and an addition unit configured to add the virtual machine suspension duration to the total duration; and the correction unit is further configured to use duration obtained after the adding as new total duration of the service.

With reference to the fourth possible implementation manner of the sixth aspect, in a fifth possible implementation manner of the sixth aspect, the time correction apparatus further includes a sending unit configured to send a hot migration charging compensation message to a charging control VNF, where the hot migration charging compensation message includes an identity of the service, the virtual machine suspension duration, and the virtual machine suspension start time, and the hot migration charging compensation message is used to instruct the charging control VNF to correct the total duration of the service and charge according to the corrected total duration of the service.

With reference to the sixth aspect and the foregoing possible implementation manners, in a sixth possible implementation manner of the sixth aspect, the receiving unit is configured to receive, using a Ve-Vnfm interface after hot migration is performed on the first virtual machine, the hot migration notification message sent by the VNFM.

A seventh aspect of the embodiments of the present disclosure provides a time correction apparatus, where the time correction apparatus is applied to a NFV system and includes a receiving unit configured to receive, after hot migration is performed on a first virtual machine, a virtual machine migration message sent by a NFVI, where the virtual machine migration message includes an ID of the first virtual machine, and the ID of the first virtual machine is used to indicate that a to-be-corrected virtual machine is the first virtual machine; a conversion unit configured to convert the virtual machine migration message into a hot migration notification message, where the hot migration notification message includes the ID of the first virtual machine; and a sending unit configured to send the hot migration notification message to a VNFM, to instruct the VNFM to correct a system time of the first virtual machine using a service control VNF.

With reference to the seventh aspect, in a first possible implementation manner of the seventh aspect, the receiving unit is configured to receive, using an Nf-Vi interface after hot migration is performed on the first virtual machine, the virtual machine migration message sent by the NFVI; and the sending unit is configured to send the hot migration notification message to the VNFM using a Vi-Vnfm interface.

An eighth aspect of the embodiments of the present disclosure provides a time correction apparatus, where the time correction apparatus is applied to a NFV system and includes an obtaining unit configured to obtain virtual machine suspension duration after hot migration is performed on a first virtual machine, where the virtual machine suspension duration is duration in which the first virtual machine is not running in a hot migration process; where the obtaining unit is further configured to obtain a clock rate of a CPU of the first virtual machine; a calculation unit configured to calculate a count increased value of a TSC of the first virtual machine according to the clock rate of the CPU of the first virtual machine and the virtual machine suspension duration; an addition unit configured to add the count increased value to a TSC count value of the first virtual machine; and a correction unit configured to use a value obtained after the adding as a new TSC count value of the first virtual machine.

With reference to the eighth aspect, in a first possible implementation manner of the eighth aspect, the calculation unit is configured to calculate the count increased value according to the following formula:

$$\text{Count increased value}=\text{Virtual machine suspension duration}\times\text{Clock rate of the CPU of the first virtual machine}/1000,$$

where a unit of the virtual machine suspension duration is millisecond, and a unit of the clock rate of the CPU of the first virtual machine is hertz.

A ninth aspect of the embodiments of the present disclosure provides a time correction system, and the time correction system includes the time correction apparatus according to any one of the fifth aspect or the possible implementation manners of the fifth aspect, the time correction apparatus according to any one of the sixth aspect or the possible implementation manners of the sixth aspect, and the time correction apparatus according to any one of the seventh aspect or the possible implementation manners of the seventh aspect; or the time correction system includes the time correction apparatus according to any one of the eighth aspect or the possible implementation manners of the eighth aspect.

According to the time correction method, apparatus, and system provided in the embodiments of the present disclosure, after hot migration is performed on a first virtual machine, a VNFM forwards, to a service control VNF (a first service control VNF) of the first virtual machine, a hot migration notification message that is from a VIM, to instruct the first service control VNF to correct a system time of the first virtual machine. In the prior art, the system time of the first virtual machine needs to be corrected after a checking period expires. By contrast, in solutions provided in the embodiments of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In the solutions, the system time of the first virtual machine can be corrected in time, so as to ensure that the service depending on the system time of the first virtual machine is not affected.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
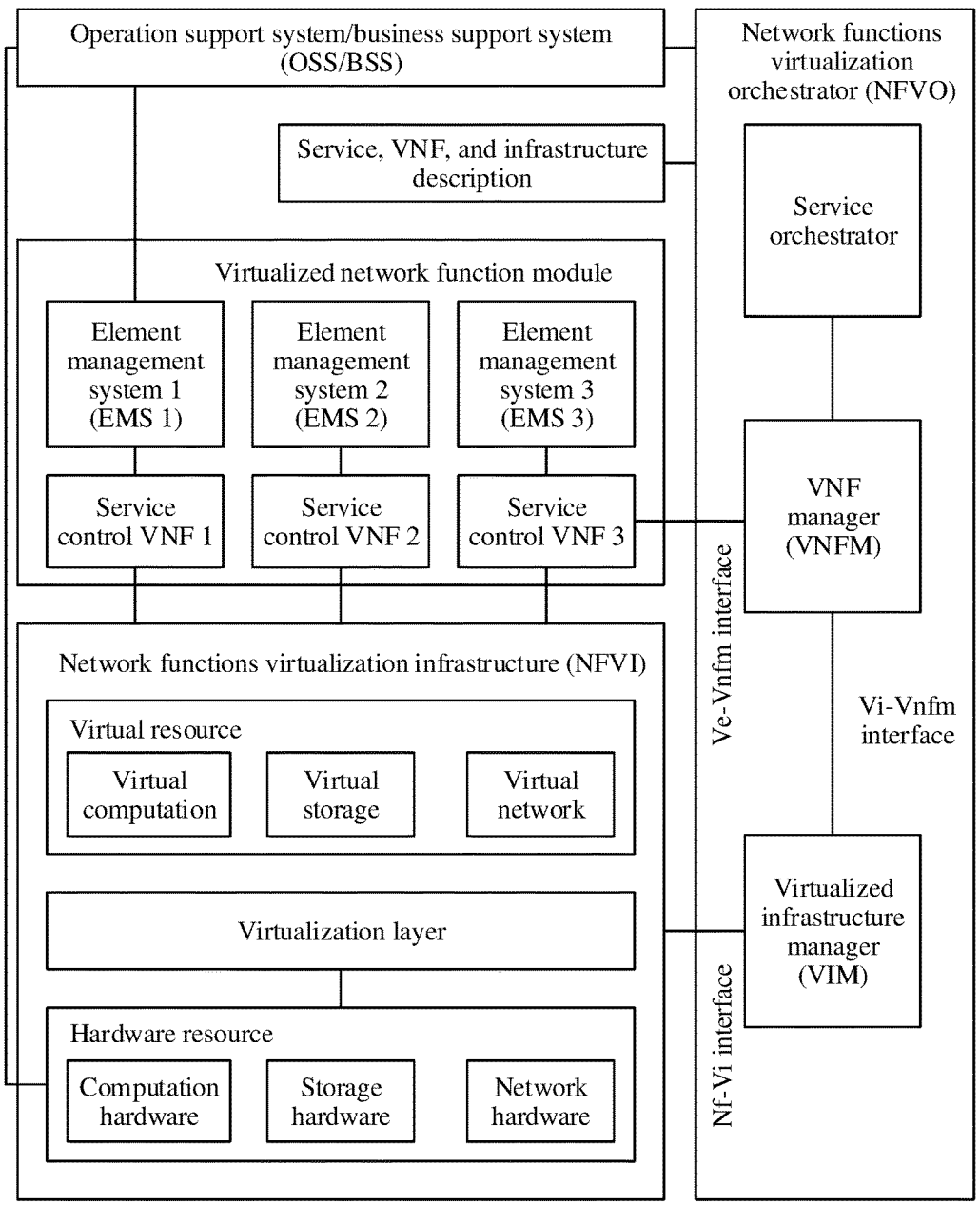
FIG. 1 is a schematic diagram of an NFV system architecture.

The technical solutions of the embodiments of the present disclosure are applied to an NFV system. As shown in FIG. 1, FIG. 1 is a schematic diagram of an NFV system architecture. The NFV system includes an operation support system/business support system (OSS/BSS), service, VNF, and infrastructure description, a virtualized network function module, a NFVI), and a network functions virtualization orchestrator (NFVO) module.

The OSS/BSS is used to support a business operation and maintenance operation.

The service, VNF, and infrastructure description is used to define various types of service-related information, a VNF model, an NFVI model, or the like.

The virtualized network function module includes an element management system (EMS) and a service control VNF. The service control VNF is used to implement a specific network function. One service control VNF can be configured on one or more virtual machines, and the EMS is responsible for operating and managing the service control VNF.

The NFVI includes a virtual resource (virtual computation, virtual storage, and a virtual network), a virtualization layer, and a hardware resource (computation hardware, storage hardware, and network hardware). A virtual resource that can be dynamically used may be obtained after the hardware resource is virtualized using the virtualization layer.

The NFVO module includes a service orchestrator, a VNFM, and a VIM. The service orchestrator is responsible for arranging an OSS/BSS service, the VNF manager is responsible for managing the service control VNF, and the VIM is responsible for managing the NFVI.

The NFVI and the VIM are connected using an Nf-Vi interface, the VIM and the VNFM are connected using a Vi-Vnfm interface, and the VNFM and the service control VNF are connected using a Ve-Vnfm interface.

It should be noted that all the NFVI, the VIM, the VNFM, the service control VNF, and the like in the NFV system may be referred to as a function node. Any function node may be implemented using an entity device, or may be implemented using multiple entity devices. One entity device may implement one function node in the NFV system, or may implement multiple function nodes in the NFV system. In may be understood that any function node in the NFV system may be a logical function module on the entity device, or may be a logical function module including multiple entity devices.

Therefore, in the embodiments of the present disclosure, steps in a time correction method provided in the embodiments of the present disclosure may be performed by one entity device, or steps in a time correction method provided in the embodiments of the present disclosure may be cooperatively performed by multiple entity devices. This is not limited in the present disclosure.

Further, to describe the time correction method provided in the present disclosure more clearly, in the following description, a logical function module (that is, a function node in the NFV system) is used as an entity for executing the method or a control object. Persons skilled in the art should understand that specific implementation of the logical function module depends on a hardware resource of an entity device on which the logical function module is located.

Figure 2:
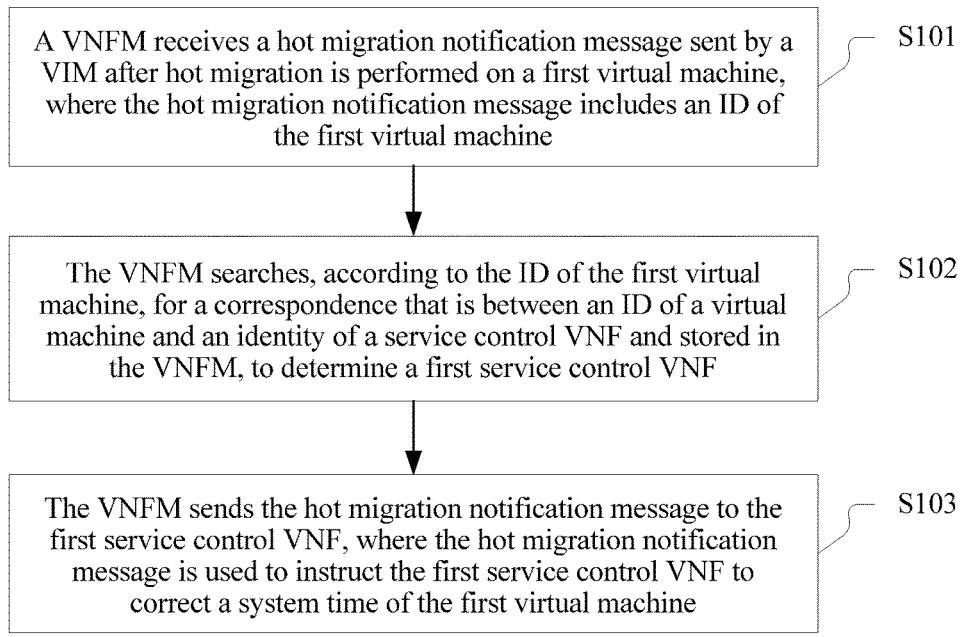
FIG. 2 is a flowchart of a time correction method according to an embodiment of the present disclosure.

An embodiment of the present disclosure provides a time correction method that is applied to an NFV system and performed by a VNMF herein. As shown in FIG. 2, the time correction method may include the following steps.

S101. A VNFM receives a hot migration notification message sent by a VIM after hot migration is performed on a first virtual machine, where the hot migration notification message includes an ID of the first virtual machine.

The ID of the first virtual machine is used to indicate that a to-be-corrected virtual machine is the first virtual machine.

S102. The VNFM searches, according to the ID of the first virtual machine, for a correspondence that is between an ID of a virtual machine and an identity of a service control VNF and stored in the VNFM, to determine a first service control VNF.

An identity of the first service control VNF is corresponding to the ID of the first virtual machine.

It should be noted that the VNFM pre-stores the correspondence between an ID of a virtual machine and an identity of a service control VNF. When receiving the hot migration notification message that is sent by the VIM and that includes the ID of the first virtual machine, the VNFM may search, according to the ID of the first virtual machine, for the correspondence between an ID of a virtual machine and an identity of a service control VNF, to determine an identity that is of a service control VNF (that is, the identity of the first service control VNF) and that is corresponding to the ID of the first virtual machine, and determine the first service control VNF.

The service control VNF refers to a VNF that controls a specific service. For example, a call control VNF refers to a VNF that controls a call service, and a charging control VNF refers to a VNF that controls a charging service.

S103. The VNFM sends the hot migration notification message to the first service control VNF, where the hot migration notification message is used to instruct the first service control VNF to correct a system time of the first virtual machine.

In the time correction method provided in this embodiment of the present disclosure, after hot migration is performed on a first virtual machine, a VNFM forwards, to a service control VNF (a first service control VNF) of the first virtual machine, a hot migration notification message that is from a VIM, to instruct the first service control VNF to correct a system time of the first virtual machine. In the prior art, the system time of the first virtual machine needs to be corrected after a checking period expires. By contrast, in a solution provided in this embodiment of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 3:
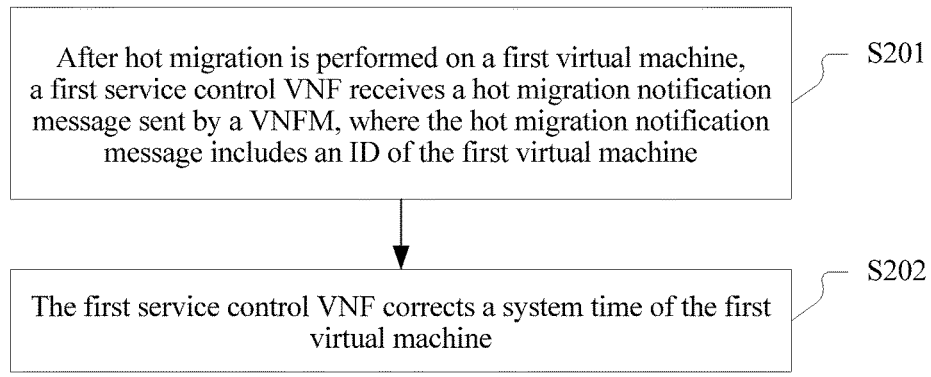
FIG. 3 is a flowchart of another time correction method according to an embodiment of the present disclosure.

An embodiment of the present disclosure further provides a time correction method that is applied to an NFV system and performed by a service control VNF herein. As shown in FIG. 3, the time correction method may include the following steps.

S201. After hot migration is performed on a first virtual machine, a first service control VNF receives a hot migration notification message sent by a VNFM, where the hot migration notification message includes an ID of the first virtual machine.

The first service control VNF is a service control VNF of the first virtual machine, and the ID of the first virtual machine is used to indicate that a to-be-corrected virtual machine is the first virtual machine.

S202. The first service control VNF corrects a system time of the first virtual machine.

The first service control VNF may find the corresponding virtual machine according to the ID of the first virtual machine, and correct the system time of the first virtual machine.

In the time correction method provided in this embodiment of the present disclosure, after hot migration is performed on a first virtual machine, a first service control VNF receives a hot migration notification message sent by a VNFM, and the first service control VNF corrects a system time of the first virtual machine. In the prior art, the system time of the first virtual machine needs to be corrected after a checking period expires. By contrast, in a solution provided in this embodiment of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 4:
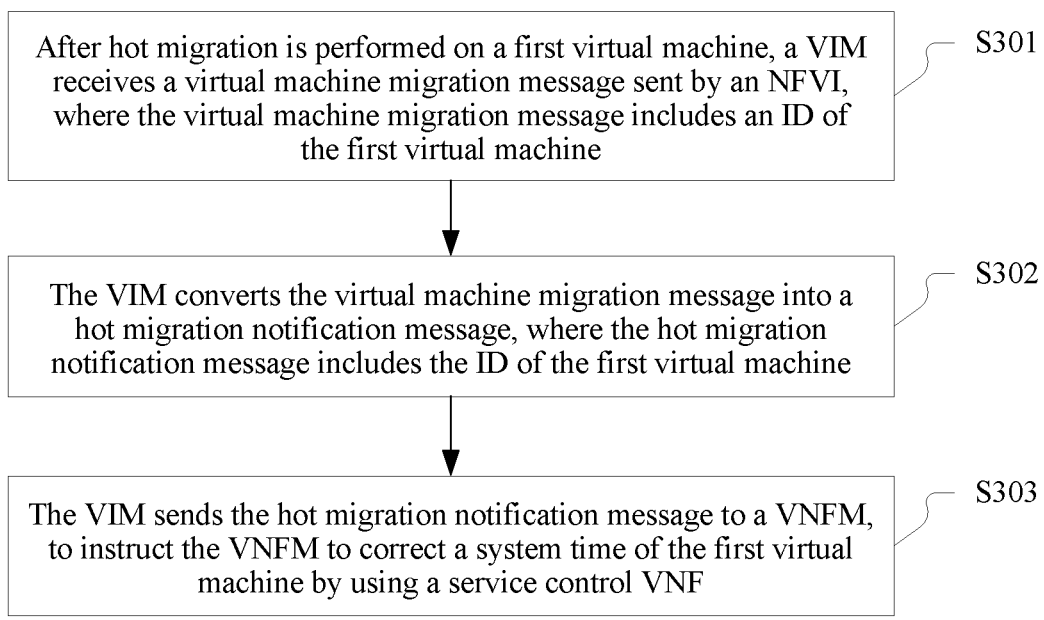
FIG. 4 is a flowchart of another time correction method according to an embodiment of the present disclosure.

An embodiment of the present disclosure further provides a time correction method that is applied to an NFV system and performed by a VIM herein. As shown in FIG. 4, the method may include the following steps.

S301. After hot migration is performed on a first virtual machine, a VIM receives a virtual machine migration message sent by an NFVI, where the virtual machine migration message includes an ID of the first virtual machine.

The ID of the first virtual machine is used to indicate that a to-be-corrected virtual machine is the first virtual machine.

Optionally, the VIM may receive, using an Nf-Vi interface, the virtual machine migration message sent by the NFVI.

S302. The VIM converts the virtual machine migration message into a hot migration notification message, where the hot migration notification message includes the ID of the first virtual machine.

Because the Nf-Vi interface between the NFVI and the VIM is different from a Vi-Vnfm interface between the VIM and a VNFM, formats of messages transferred using the two interfaces are different. Therefore, in S302, the VIM needs to convert a message that is transferred using the Nf-Vi interface into a message that can be transferred using the Vi-Vnfm interface, that is, convert the virtual machine hot migration message into the hot migration notification message.

S303. The VIM sends the hot migration notification message to a VNFM, to instruct the VNFM to correct a system time of the first virtual machine using a service control VNF.

Optionally, the VIM may send the hot migration notification message to the VNFM using the Vi-Vnfm interface.

In the time correction method provided in this embodiment of the present disclosure, after hot migration is performed on a first virtual machine, a VIM converts a virtual machine migration message that is from an NFVI into a hot migration notification message that includes an ID of the first virtual machine, and sends the hot migration notification message to a VNFM, to instruct the VNFM to correct a system time of the first virtual machine using a service control VNF. In the prior art, the system time of the first virtual machine needs to be corrected after a checking period expires. By contrast, in a solution provided in this embodiment of the present disclosure, the VIM sends the hot migration notification message to the VNFM, to instruct the VNFM to correct the system time of the first virtual machine using the service control VNF, that is, a first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 5A:
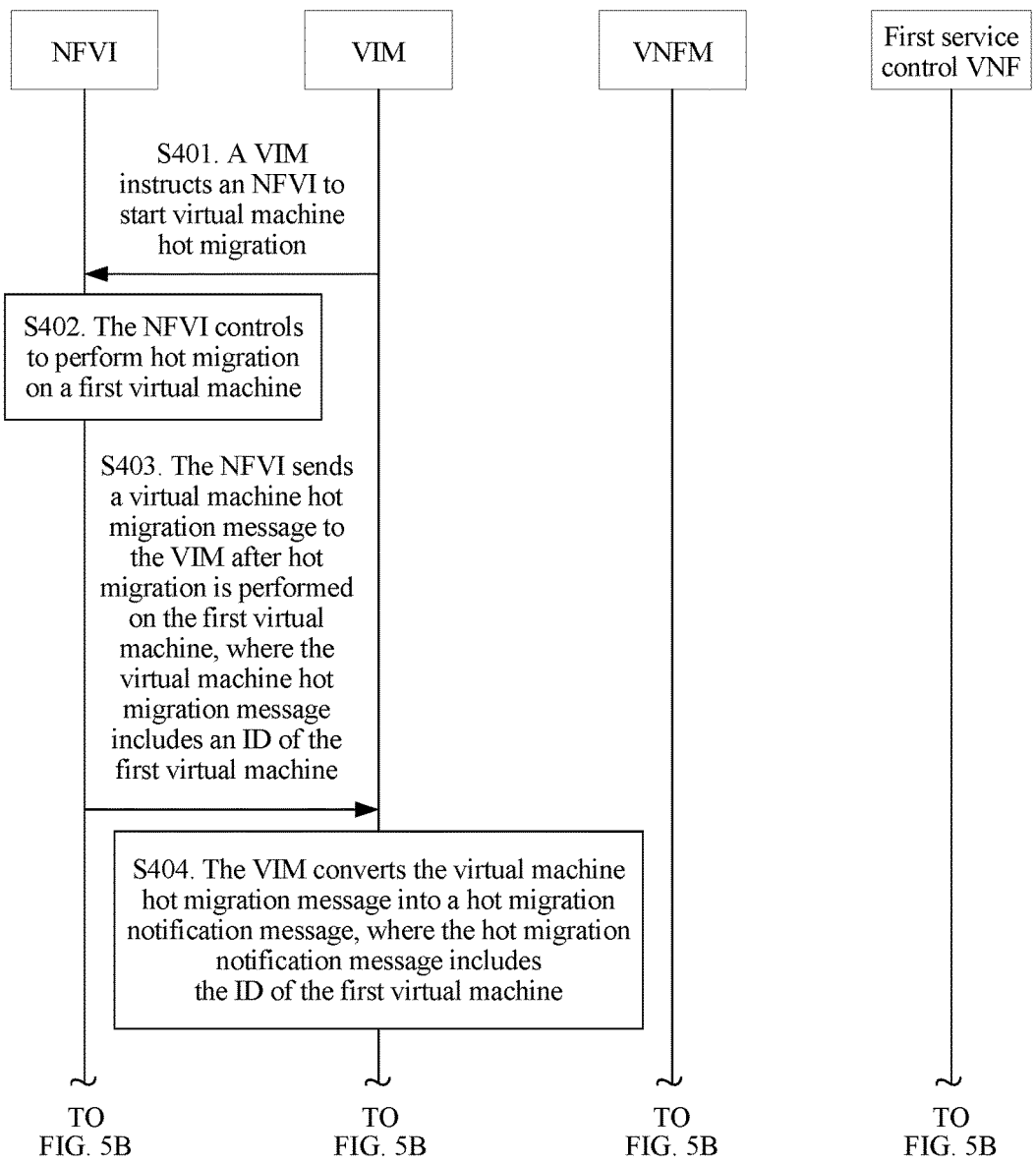
FIG. 5A and FIG. 5B are a flowchart of another time correction method according to an embodiment of the present disclosure.
Figure 5B:
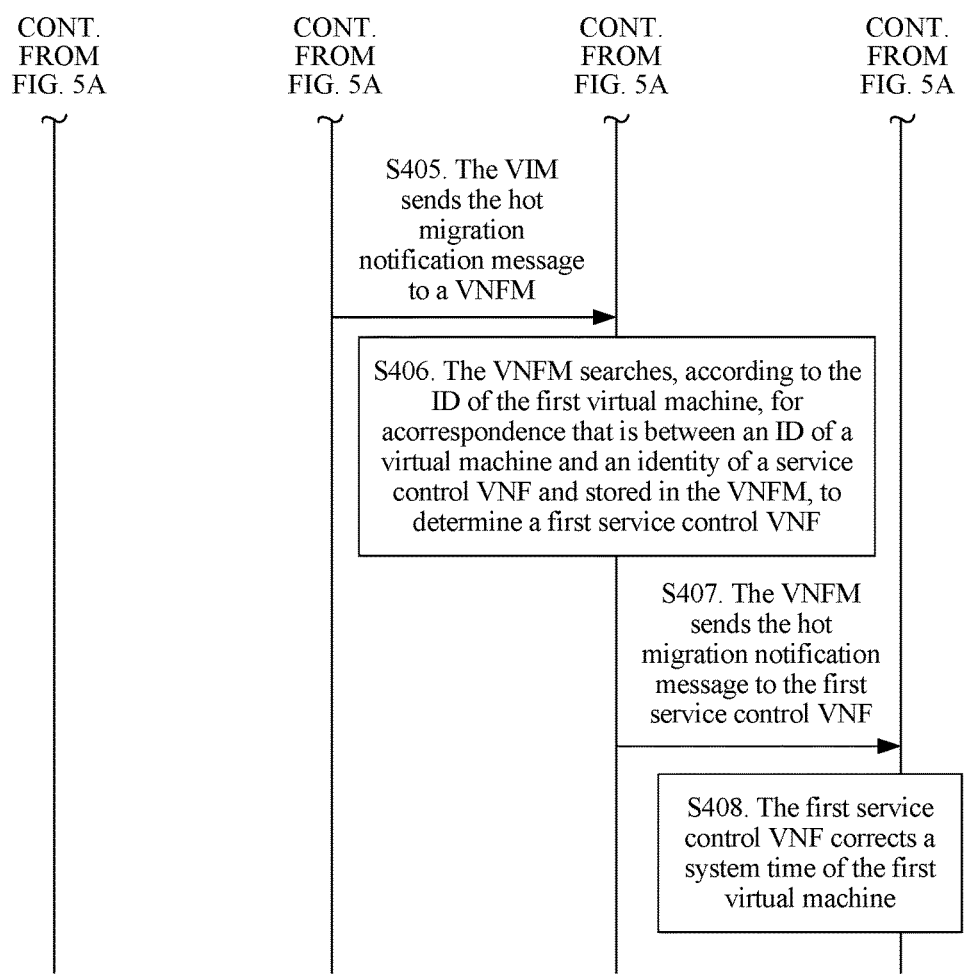

In an embodiment, a time correction method provided in this embodiment of the present disclosure is described using message interaction between an NFVI, a VIM, a VNFM, and a service control VNF as an example. As shown in FIG. 5A and FIG. 5B, the time correction method may include the following steps.

S401. A VIM instructs an NFVI to start virtual machine hot migration.

S402. The NFVI controls to perform hot migration on a first virtual machine.

After receiving an instruction of the VIM, the NFVI controls, according to the instruction of the VIM, to perform hot migration on the first virtual machine, that is, transfers the first virtual machine that runs on one hardware device to another hardware device for running.

S403. The NFVI sends a virtual machine hot migration message to the VIM after hot migration is performed on the first virtual machine, where the virtual machine hot migration message includes an ID of the first virtual machine.

The ID of the first virtual machine is used to indicate that a to-be-corrected virtual machine is the first virtual machine.

Optionally, the VIM may receive, using an Nf-Vi interface, the virtual machine migration message sent by the NFVI.

S404. The VIM converts the virtual machine hot migration message into a hot migration notification message, where the hot migration notification message includes the ID of the first virtual machine.

Because the Nf-Vi interface between the NFVI and the VIM is different from a Vi-Vnfm interface between the VIM and a VNFM, formats of messages transferred using the two interfaces are different. Therefore, in S404, the VIM needs to convert a message that is transferred using the Nf-Vi interface into a message that can be transferred using the Vi-Vnfm interface, that is, convert the virtual machine hot migration message into the hot migration notification message.

S405. The VIM sends the hot migration notification message to a VNFM.

Optionally, the VIM may send the hot migration notification message to the VNFM using the Vi-Vnfm interface.

S406. The VNFM searches, according to the ID of the first virtual machine, for a correspondence that is between an ID of a virtual machine and an identity of a service control VNF and stored in the VNFM, to determine a first service control VNF.

An identity of the first service control VNF is corresponding to the ID of the first virtual machine. When receiving the hot migration notification message that is sent by the VIM and that includes the ID of the first virtual machine, the VNFM may search, according to the ID of the first virtual machine, for the correspondence between an ID of a virtual machine and an identity of a service control VNF, to determine an identity that is of a service control VNF (that is, the identity of the first service control VNF) and that is corresponding to the ID of the first virtual machine, and determine the first service control VNF.

S407. The VNFM sends the hot migration notification message to the first service control VNF.

The hot migration notification message is used to instruct the first service control VNF to correct a system time of the first virtual machine.

Optionally, the VNFM may send the hot migration notification message to the first service control VNF using a Ve-Vnfm interface.

S408. The first service control VNF corrects a system time of the first virtual machine.

The first service control VNF may correct the time after receiving the hot migration notification message, and does not need to wait until a preset checking period expires. Therefore, a prior-art problem that after hot migration is performed on the first virtual machine, a service depending on the system time of the first virtual machine is affected due to an excessively long checking period can be resolved.

Optionally, in a first case of this embodiment of the present disclosure, the hot migration notification message is used to instruct the first service control VNF to correct the system time of the first virtual machine according to a time of an NTP system time source.

In this case, a specific step of correcting the system time of the first virtual machine by the first service control VNF may include obtaining, by the first service control VNF, the time of the NTP system time source, and correcting the system time of the first virtual machine to the time of the NTP system time source.

Optionally, in a second case of this embodiment of the present disclosure, the hot migration notification message further includes virtual machine suspension duration, and the virtual machine suspension duration is duration in which the first virtual machine is not running in a hot migration process. The hot migration notification message is used to instruct the first service control VNF to correct the system time of the first virtual machine according to the virtual machine suspension duration.

It should be noted that it is assumed that the first virtual machine runs on a hardware device 1, and if hot migration is to be performed to enable the first virtual machine to run on a hardware device 2, a virtual machine that is completely the same as the first virtual machine needs to be created on the hardware device 2, a memory of the first virtual machine needs to be copied to a memory of the newly created virtual machine, and the first virtual machine on the hardware device 1 may be shut down after the copying is completed. Then the newly created virtual machine needs to be checked, and the newly created virtual machine runs after the check is completed. In this way, for a user, the newly created virtual machine is completely the same as the first virtual machine, and this is equivalent to migrating the first virtual machine from the hardware device 1 to the hardware device 2. However, in a process of checking the virtual machine, neither the first virtual machine on the hardware device 1 nor the newly created virtual machine on the hardware device 2 runs. Duration of this process is the virtual machine suspension duration, and the system time of the first virtual machine pauses in this process.

In this case, a specific step of correcting the system time of the first virtual machine by the first service control VNF may include adding, by the first service control VNF, the virtual machine suspension duration to the system time of the first virtual machine, and using a system time obtained after the adding as a new system time of the first virtual machine.

Optionally, in a third case of this embodiment of the present disclosure, the hot migration notification message further includes virtual machine suspension duration, and the virtual machine suspension duration is duration in which the first virtual machine is not running in a hot migration process. The hot migration notification message is further used to instruct the first service control VNF to correct the system time of the first virtual machine according to a time of an NTP system time source, and correct the system time of the first virtual machine according to the virtual machine suspension duration when failing to correct the system time of the first virtual machine according to the time of the NTP system time source.

In this case, a specific step of correcting the system time of the first virtual machine by the first service control VNF may include obtaining, by the first service control VNF, the time of the NTP system time source, and if the first service control VNF fails to obtain the time of the NTP system time source (for example, an NFV system cannot establish a connection to the NTP system time source (for example, a network fault occurs)), adding, by the first service control VNF, the virtual machine suspension duration to the system time of the first virtual machine, and using a system time obtained after the adding as a new system time of the first virtual machine.

It should be noted that if the hot migration notification message cannot be sent to the VNFM because a communication connection between the VIM and the VNFM is faulty, and consequently, the first service control VNF cannot obtain the virtual machine suspension duration and further, the first service control VNF cannot correct the system time of the first virtual machine using the virtual machine suspension duration, the VIM may buffer the hot migration notification message. When the communication connection between the VIM and the VNFM becomes normal, the VIM sends the buffered hot migration notification message to the VNFM, and then, the VNFM sends the hot migration notification message to the first service control VNF. After receiving the hot migration notification message, the first service control VNF needs to determine whether the first service control VNF has corrected the system time of the first virtual machine to a current time of the NTP system time source in a period of time from a time at which the first virtual machine starts hot migration to a time at which the first service control VNF receives the hot migration notification message. If the first service control VNF has corrected the system time of the first virtual machine to the current time of the NTP system time source, the first service control VNF does not correct the system time of the first virtual machine again. If the first service control VNF has not corrected the system time of the first virtual machine to the current time of the NTP system time source, the first service control VNF needs to correct the system time of the first virtual machine, and for a specific correction method, reference may be made to description in the foregoing three cases.

In the time correction method provided in this embodiment of the present disclosure, after hot migration is performed on a first virtual machine, a VNFM forwards, to a service control VNF (a first service control VNF) of the first virtual machine, a hot migration notification message that is from a VIM, to instruct the first service control VNF to correct a system time of the first virtual machine. In the prior art, the system time of the first virtual machine needs to be corrected after a checking period expires. By contrast, in a solution provided in this embodiment of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 6A:
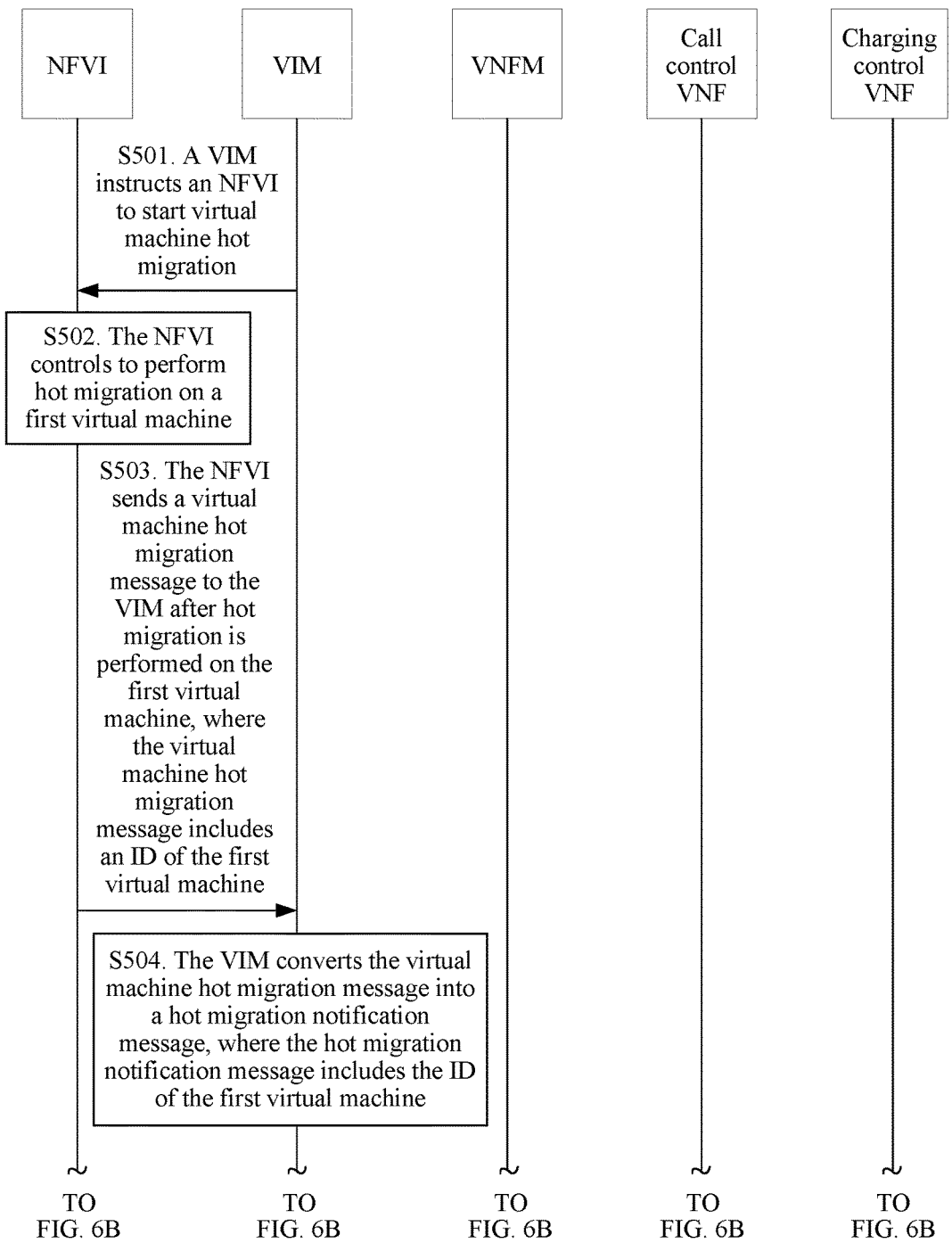
FIG. 6A, FIG. 6B, and FIG. 6C are a flowchart of another time correction method according to an embodiment of the present disclosure.
Figure 6B:
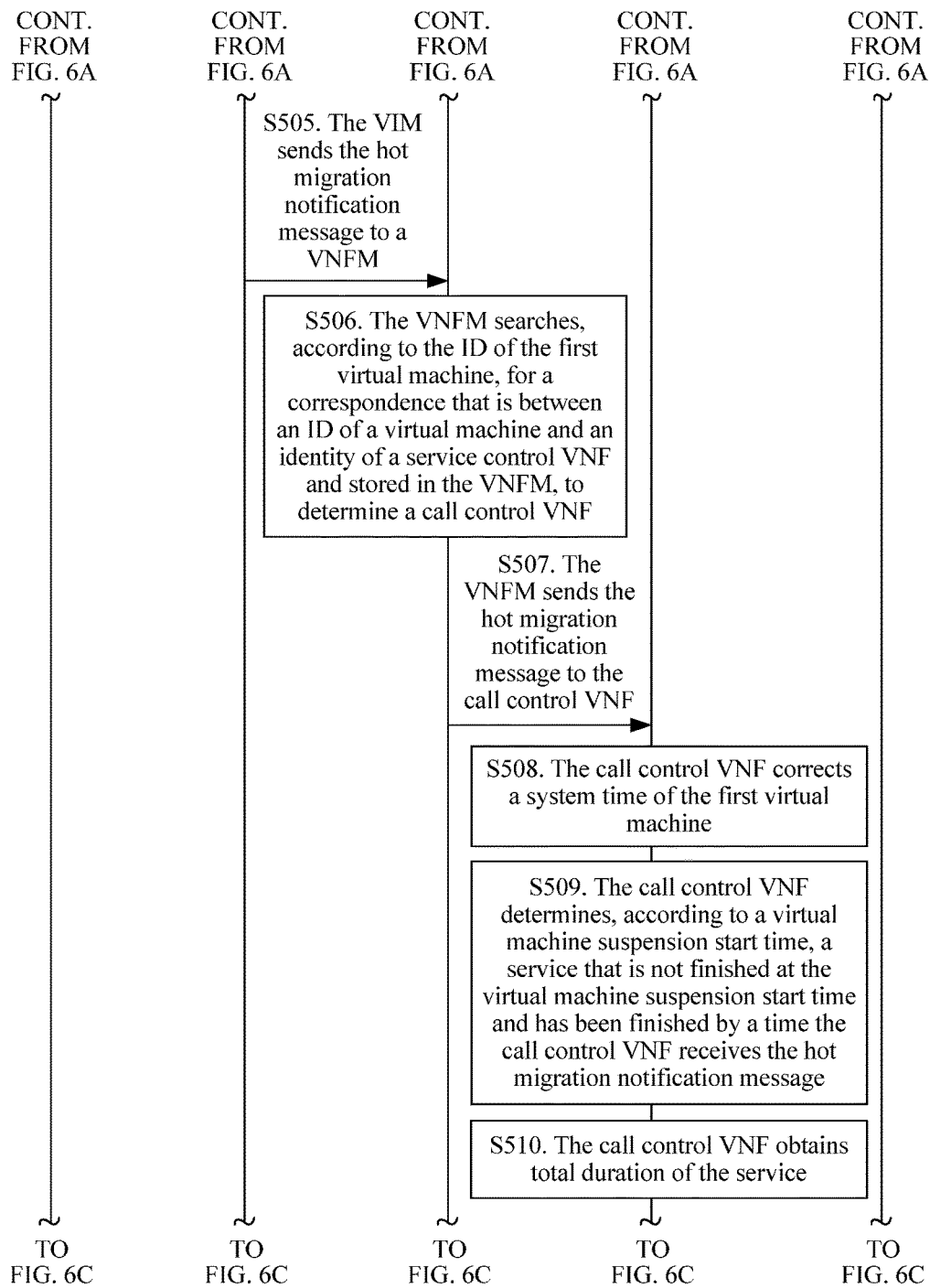
Figure 6C:
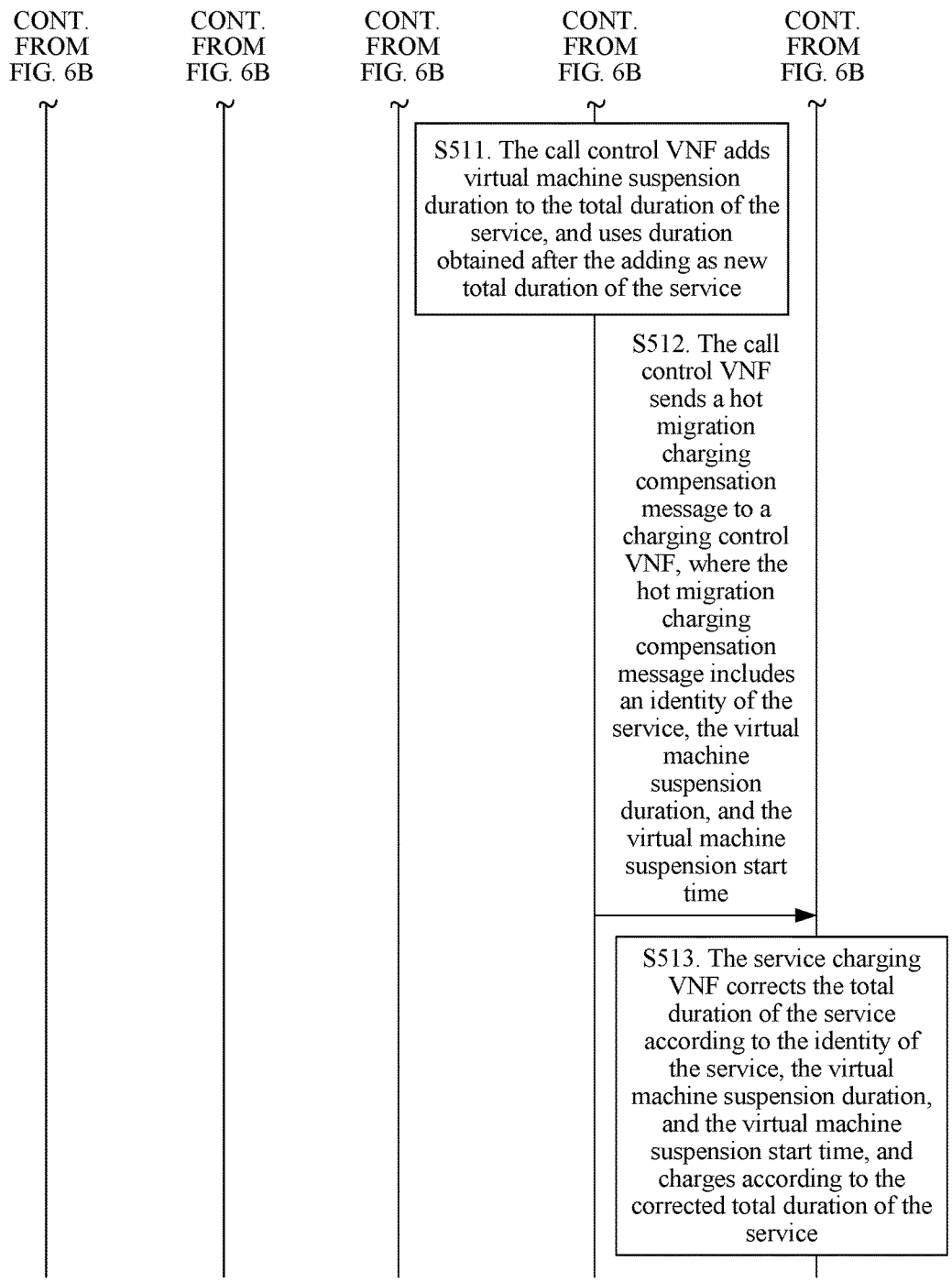

In an embodiment based on the time correction method shown in FIG. 5A and FIG. 5B, a time correction method provided in this embodiment of the present disclosure is described using a call control VNF as an example of a first service control VNF. As shown in FIG. 6A, FIG. 6B, and FIG. 6C, the time correction method may include the following steps.

S501. A VIM instructs an NFVI to start virtual machine hot migration.

S502. The NFVI controls to perform hot migration on a first virtual machine.

S503. The NFVI sends a virtual machine hot migration message to the VIM after hot migration is performed on the first virtual machine, where the virtual machine hot migration message includes an ID of the first virtual machine.

The ID of the first virtual machine is used to indicate that a to-be-corrected virtual machine is the first virtual machine.

Optionally, the VIM may receive, using an Nf-Vi interface, the virtual machine migration message sent by the NFVI.

S504. The VIM converts the virtual machine hot migration message into a hot migration notification message, where the hot migration notification message includes the ID of the first virtual machine.

S505. The VIM sends the hot migration notification message to a VNFM.

Optionally, the VIM may send the hot migration notification message to the VNFM using a Vi-Vnfm interface.

S506. The VNFM searches, according to the ID of the first virtual machine, for a correspondence that is between an ID of a virtual machine and an identity of a service control VNF and stored in the VNFM, to determine a first service control VNF (that is, a call control VNF).

S507. The VNFM sends the hot migration notification message to the call control VNF.

The hot migration notification message is used to instruct the call control VNF to correct a system time of the first virtual machine.

Optionally, the VNFM may send the hot migration notification message to the call control VNF using a Ve-Vnfm interface.

S508. The call control VNF corrects a system time of the first virtual machine.

A method for correcting the system time of the first virtual machine by the call control VNF is the same as a method for correcting the system time of the first virtual machine by the first service control VNF in S408. For specific description of S501 to S508, refer to description of S401 to S408. Details are not described herein again in this embodiment.

Further, the hot migration notification message may include a virtual machine suspension start time and virtual machine suspension duration. The virtual machine suspension start time is a start time at which the first virtual machine stops running in a hot migration process, and the virtual machine suspension duration is duration in which the first virtual machine is not running in the hot migration process. The time correction method provided in this embodiment of the present disclosure may further include the following steps.

S509. The call control VNF determines, according to a virtual machine suspension start time, a service that is not finished at the virtual machine suspension start time and has been finished by a time the call control VNF receives the hot migration notification message.

For example, the first virtual machine starts hot migration at 12:00:00, the hot migration ends at 12:01:00, the virtual machine suspension start time is 12:00:55, the virtual machine suspension duration is 1 second, and the call control VNF receives the hot migration notification message at 12:01:05. In this case, the call control VNF may determine a service that is not finished at 12:00:55 and that has been finished by 12:01:05.

S510. The call control VNF obtains total duration of the service.

S511. The call control VNF adds virtual machine suspension duration to the total duration of the service, and uses duration obtained after the adding as new total duration of the service.

S512. The call control VNF sends a hot migration charging compensation message to a charging control VNF, where the hot migration charging compensation message includes an identity of the service, the virtual machine suspension duration, and the virtual machine suspension start time.

The hot migration charging compensation message is used to instruct the charging control VNF to correct the total duration of the service and charge according to the corrected total duration of the service.

S513. The charging control VNF corrects the total duration of the service according to the identity of the service, the virtual machine suspension duration, and the virtual machine suspension start time, and charges according to the corrected total duration of the service.

In this way, the corrected total duration of the service is an actual time length for which the service lasts. Therefore, charging according to the corrected total duration of the service can avoid a charging deviation problem caused by inaccurate calculation of the total duration of the service.

In the time correction method provided in this embodiment of the present disclosure, after hot migration is performed on a first virtual machine, a VNFM forwards, to a call control VNF, a hot migration notification message that is from a VIM, to instruct the call control VNF to correct a system time of the first virtual machine. In the prior art, the system time of the first virtual machine needs to be corrected after a checking period expires. By contrast, in a solution provided in this embodiment of the present disclosure, the call control VNF may correct the system time of the first virtual machine according to an instruction of the hot migration notification message, that is, the call control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved.

In this solution, the call control VNF may determine, according to a virtual machine suspension start time, a service that is not finished at the virtual machine suspension start time and has been finished by a time the call control VNF receives the hot migration notification message, and then, add virtual machine suspension duration to total duration of the service, and use duration obtained after the adding as new total duration of the service, that is, correct the total duration of the service. The call control VNF may further send a hot migration charging compensation message to a charging control VNF. The hot migration charging compensation message includes an identity of the service, the virtual machine suspension duration, and the virtual machine suspension start time. The hot migration charging compensation message is used to instruct the charging control VNF to correct the total duration of the service and charge according to the corrected total duration of the service. In this way, the corrected total duration of the service is an actual time length for which the service lasts. Therefore, charging by the charging control VNF according to the corrected total duration of the service can avoid a charging deviation problem caused by inaccurate calculation of the total duration of the service.

Figure 7:
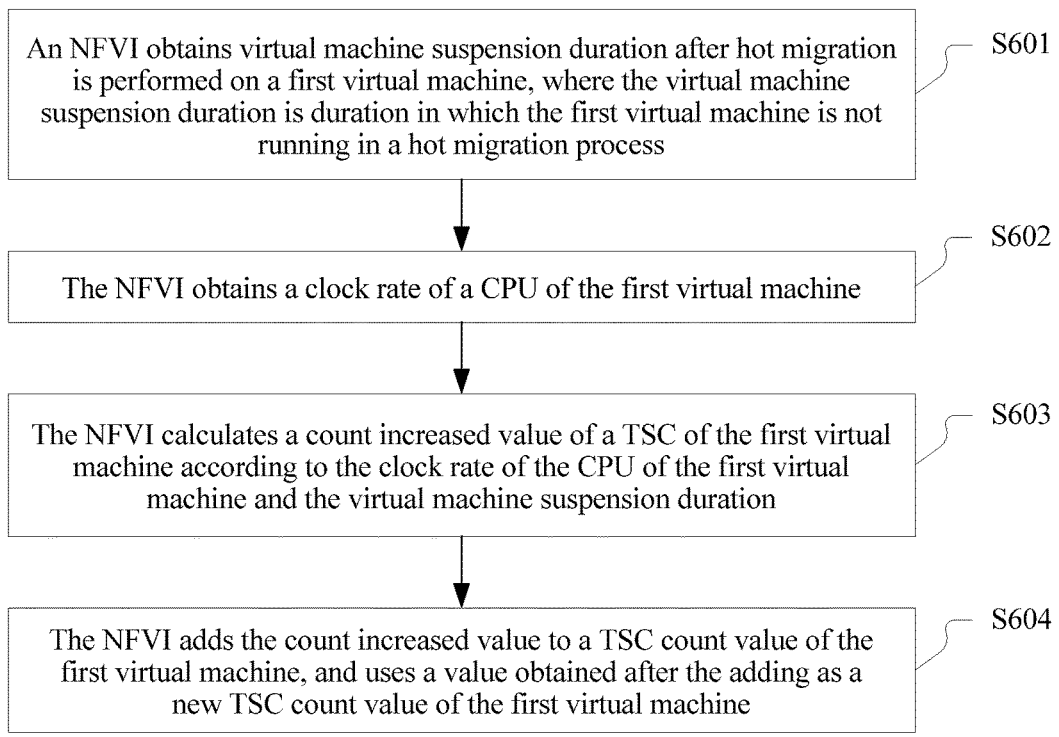
FIG. 7 is a flowchart of another time correction method according to an embodiment of the present disclosure.

An embodiment of the present disclosure further provides a time correction method that is applied to an NFV system. As shown in FIG. 7, the time correction method includes the following steps.

S601. An NFVI obtains virtual machine suspension duration after hot migration is performed on a first virtual machine, where the virtual machine suspension duration is duration in which the first virtual machine is not running in a hot migration process.

S602. The NFVI obtains a clock rate of a CPU of the first virtual machine.

S603. The NFVI calculates a count increased value of a TSC of the first virtual machine according to the clock rate of the CPU of the first virtual machine and the virtual machine suspension duration.

Preferably, the NFVI may calculate the count increased value according to the following formula:

Count increased value=Virtual machine suspension duration×Clock rate of the CPU of the first virtual machine/1000.

A unit of the virtual machine suspension duration is millisecond (ms), and a unit of the clock rate of the CPU of the first virtual machine is hertz (Hz).

For example, if the virtual machine suspension duration is 800 ms, and the clock rate of the CPU of the first virtual machine is 2.3 GHz, the count increased value=800×2.3× 1000000000/1000=1840000000.

Certainly, the NFVI may calculate the count increased value using another formula. For example, another coefficient may be added to the foregoing formula, and the NFVI calculates the count increased value according to the formula to which the coefficient is added. This is not limited in this embodiment of the present disclosure.

S604. The NFVI adds the count increased value to a TSC count value of the first virtual machine, and uses a value obtained after the adding as a new TSC count value of the first virtual machine.

In the time correction method provided in this embodiment of the present disclosure, an NFVI adds, to a TSC count value of a first virtual machine, a count increased value calculated according to a clock rate of a CPU of the first virtual machine and virtual machine suspension duration, and uses a value obtained after the adding as a new TSC count value of the first virtual machine. In this way, the virtual machine suspension duration is included when total duration of a service is subsequently calculated according to the new TSC count value. Therefore, charging deviation can be avoided during charging according to the calculated total duration of the service.

Figure 8:
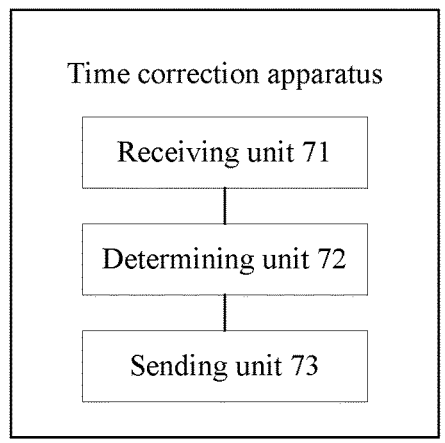
FIG. 8 is a schematic composition diagram of a time correction apparatus according to an embodiment of the present disclosure.

An embodiment of the present disclosure further provides a time correction apparatus that is applied to an NFV system. The time correction apparatus may be an entity apparatus/a virtual apparatus of the VNFM in the method embodiment shown in FIG. 2, FIG. 5A and FIG. 5B, or FIG. 6A, FIG. 6B, and FIG. 6C, or may be an entity apparatus that is in an NFV system and in which a logical function module that can perform a method procedure performed by a VNFM is located. The entity apparatus may be independently installed in a VNFM entity apparatus, or may be an entity apparatus that can communicate with a VNFM entity apparatus. The time correction apparatus may further be presented in a form of a chip, and the chip carries an application program that can implement the foregoing method procedure performed by a VNFM. As shown in FIG. 8, the time correction apparatus includes a receiving unit 71, a determining unit 72, and a sending unit 73.

The receiving unit 71 is configured to receive a hot migration notification message sent by a VIM after hot migration is performed on a first virtual machine. The hot migration notification message includes an ID of the first virtual machine, and the ID of the first virtual machine is used to indicate that a to-be-corrected virtual machine is the first virtual machine.

The determining unit 72 is configured to search, according to the ID of the first virtual machine, for a correspondence that is between an ID of a virtual machine and an identity of a service control VNF and stored in a VNFM, to determine a first service control VNF. An identity of the first service control VNF is corresponding to the ID of the first virtual machine.

The sending unit 73 is configured to send the hot migration notification message to the first service control VNF. The hot migration notification message is used to instruct the first service control VNF to correct a system time of the first virtual machine.

Optionally, in a first case of this embodiment of the present disclosure, the hot migration notification message is used to instruct the first service control VNF to correct the system time of the first virtual machine according to a time of an NTP system time source.

Optionally, in a second case of this embodiment of the present disclosure, the hot migration notification message further includes virtual machine suspension duration, and the virtual machine suspension duration is duration in which the first virtual machine is not running in a hot migration process.

The hot migration notification message is used to instruct the first service control VNF to correct the system time of the first virtual machine according to the virtual machine suspension duration.

Optionally, in a third case of this embodiment of the present disclosure, the hot migration notification message further includes virtual machine suspension duration, and the virtual machine suspension duration is duration in which the first virtual machine is not running in a hot migration process.

The hot migration notification message is further used to instruct the first service control VNF to correct the system time of the first virtual machine according to a time of an NTP system time source, and correct the system time of the first virtual machine according to the virtual machine suspension duration when failing to correct the system time of the first virtual machine according to the time of the NTP system time source.

Further, the hot migration notification message further includes a virtual machine suspension start time, and the virtual machine suspension start time is a start time at which the first virtual machine stops running in the hot migration process.

Optionally, the receiving unit 71 is configured to receive, using a Vi-Vnfm interface, the hot migration notification message sent by the VIM after hot migration is performed on the first virtual machine.

Optionally, the sending unit 73 is configured to send the hot migration notification message to the first service control VNF using a Ve-Vnfm interface.

It should be noted that, for specific description of some function modules in the time correction apparatus provided in this embodiment of the present disclosure, reference may be made to corresponding content in the method embodiments, and details are not described herein in this embodiment.

After hot migration is performed on a first virtual machine, the time correction apparatus provided in this embodiment of the present disclosure can forward, to a service control VNF (a first service control VNF) of the first virtual machine, a hot migration notification message that is from a VIM, to instruct the first service control VNF to correct a system time of the first virtual machine. In the prior art, the system time of the first virtual machine needs to be corrected after a checking period expires. By contrast, in a solution provided in this embodiment of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 9:
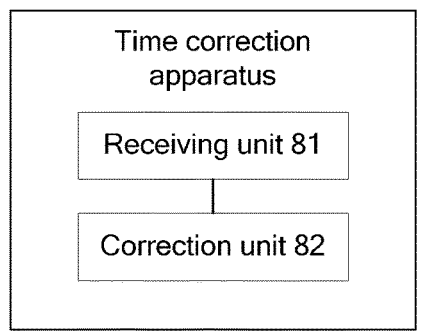
FIG. 9 is a schematic composition diagram of another time correction apparatus according to an embodiment of the present disclosure.

An embodiment of the present disclosure further provides a time correction apparatus that is applied to an NFV system. The time correction apparatus may be an entity apparatus/a virtual apparatus of the first service control VNF in the method embodiment shown in FIG. 3, FIG. 5A and FIG. 5B, or FIG. 6A, FIG. 6B, and FIG. 6C, or may be an entity apparatus that is in an NFV system and in which a logical function module that can perform a method procedure performed by a first service control VNF is located. The entity apparatus may be independently installed in a first service control VNF entity apparatus, or may be an entity apparatus that can communicate with a first service control VNF entity apparatus. The time correction apparatus may further be presented in a form of a chip, and the chip carries an application program that can implement the foregoing method procedure that can be performed by a first service control VNF. As shown in FIG. 9, the time correction apparatus includes a receiving unit 81 and a correction unit 82.

The receiving unit 81 is configured to receive, after hot migration is performed on a first virtual machine, a hot migration notification message sent by a VNFM. The hot migration notification message includes an ID of the first virtual machine, and the ID of the first virtual machine is used to indicate that a to-be-corrected virtual machine is the first virtual machine.

The correction unit 82 is configured to correct a system time of the first virtual machine.

Figure 10:
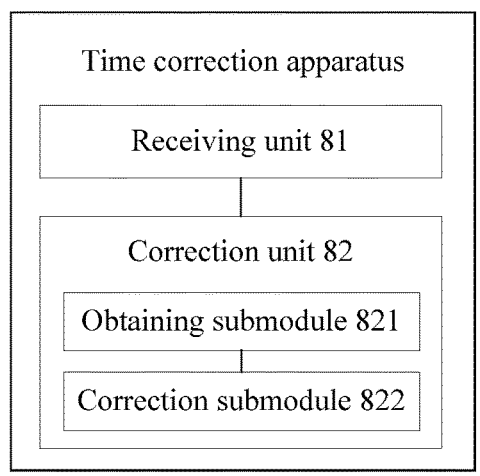
FIG. 10 is a schematic composition diagram of another time correction apparatus according to an embodiment of the present disclosure.

Optionally, in a first case of this embodiment of the present disclosure, as shown in FIG. 10, the correction unit 82 includes an obtaining submodule 821 and a correction submodule 822.

The obtaining submodule 821 is configured to obtain a time of an NTP system time source.

The correction submodule 822 is configured to correct the system time of the first virtual machine to the time of the NTP system time source.

Figure 11:
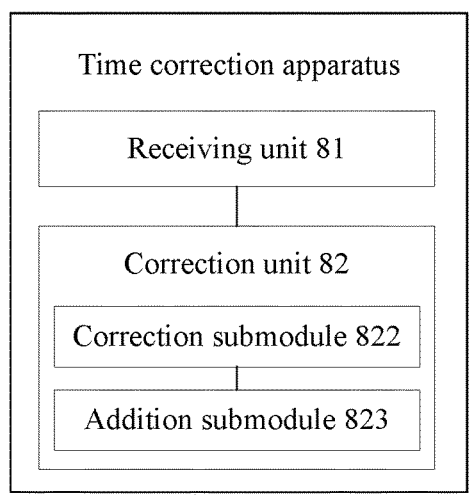
FIG. 11 is a schematic composition diagram of another time correction apparatus according to an embodiment of the present disclosure.

Optionally, in a second case of this embodiment of the present disclosure, the hot migration notification message further includes virtual machine suspension duration, and the virtual machine suspension duration is duration in which the first virtual machine is not running in a hot migration process. As shown in FIG. 11, the correction unit 82 includes an addition submodule 823 and a correction submodule 822.

The addition submodule 823 is configured to add the virtual machine suspension duration to the system time of the first virtual machine.

The correction submodule 822 is configured to use a system time obtained after the adding as a new system time of the first virtual machine.

Figure 12:
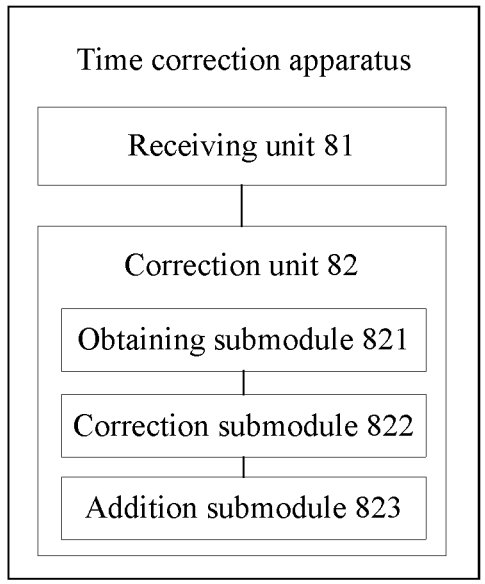
FIG. 12 is a schematic composition diagram of another time correction apparatus according to an embodiment of the present disclosure.

Optionally, in a third case of this embodiment of the present disclosure, the hot migration notification message further includes virtual machine suspension duration, and the virtual machine suspension duration is duration in which the first virtual machine is not running in a hot migration process. As shown in FIG. 12, the correction unit 82 further includes an obtaining submodule 821, a correction submodule 822, and an addition submodule 823.

The obtaining submodule 821 is configured to obtain a time of an NTP system time source.

The addition submodule 823 is configured to add the virtual machine suspension duration to the system time of the first virtual machine when the obtaining submodule 821 fails to obtain the time of the NTP system time source.

The correction submodule 822 is configured to use a system time obtained after the adding as a new system time of the first virtual machine.

Further, the hot migration notification message further includes a virtual machine suspension start time, and the virtual machine suspension start time is a start time at which the first virtual machine stops running in the hot migration process. The time correction apparatus is a call control VNF.

Figure 13:
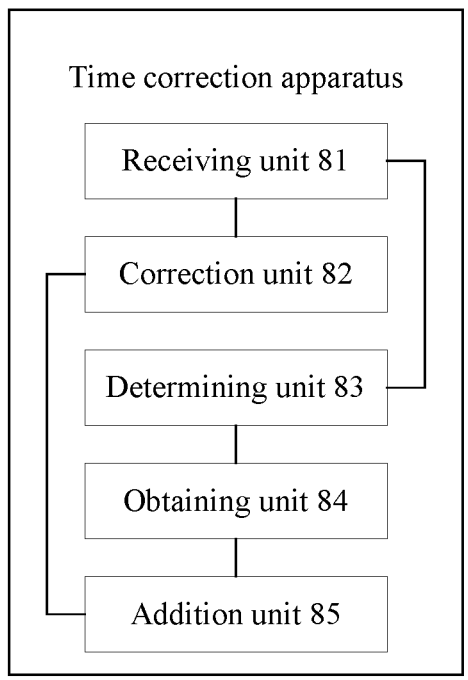
FIG. 13 is a schematic composition diagram of another time correction apparatus according to an embodiment of the present disclosure.

Further, as shown in FIG. 13, the time correction apparatus further includes a determining unit 83, an obtaining unit 84, and an addition unit 85.

The determining unit 83 is configured to determine, according to the virtual machine suspension start time, a service that has not been finished at the virtual machine suspension start time and has been finished when the receiving unit 81 receives the hot migration notification message.

The obtaining unit 84 is configured to obtain total duration of the service.

The addition unit 85 is configured to add the virtual machine suspension duration to the total duration.

The correction unit 82 is further configured to use duration obtained after the adding as new total duration of the service.

Figure 14:
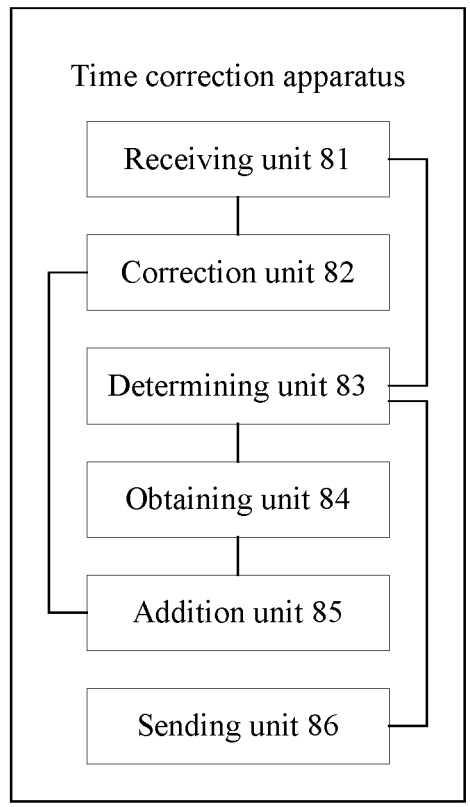
FIG. 14 is a schematic composition diagram of another time correction apparatus according to an embodiment of the present disclosure.

Further, as shown in FIG. 14, the time correction apparatus further includes a sending unit 86.

The sending unit 86 is configured to send a hot migration charging compensation message to a charging control VNF. The hot migration charging compensation message includes an identity of the service, the virtual machine suspension duration, and the virtual machine suspension start time, and the hot migration charging compensation message is used to instruct the charging control VNF to correct the total duration of the service and charge according to the corrected total duration of the service.

Further, the receiving unit 81 is configured to receive, using a Ve-Vnfm interface after hot migration is performed on the first virtual machine, the hot migration notification message sent by the VNFM.

It should be noted that, for specific description of some function modules in the time correction apparatus provided in this embodiment of the present disclosure, reference may be made to corresponding content in the method embodiments, and details are not described herein in this embodiment.

After hot migration is performed on a first virtual machine, the time correction apparatus provided in this embodiment of the present disclosure can receive a hot migration notification message sent by a VNFM, and correct a system time of the first virtual machine. In the prior art, the system time of the first virtual machine needs to be corrected after a checking period expires. By contrast, in a solution provided in this embodiment of the present disclosure, the time correction apparatus may correct the system time of the first virtual machine according to an instruction of the hot migration notification message, that is, the time correction apparatus corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 15:
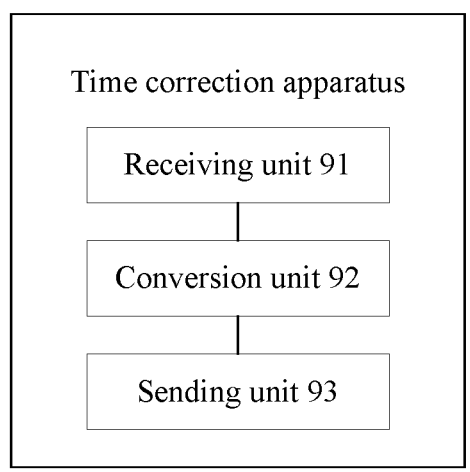
FIG. 15 is a schematic composition diagram of another time correction apparatus according to an embodiment of the present disclosure.

An embodiment of the present disclosure further provides a time correction apparatus that is applied to an NFV system. The time correction apparatus may be an entity apparatus/a virtual apparatus of the VIM in the method embodiment shown in FIG. 4, FIG. 5A and FIG. 5B, or FIG. 6A, FIG. 6B, and FIG. 6C, or may be an entity apparatus that is in an NFV system and in which a logical function module that can perform a method procedure performed by a VIM. The entity apparatus may be independently installed in a VIM entity apparatus, or may be an entity apparatus that can communicate with a VIM entity apparatus. The time correction apparatus may further be presented in a form of a chip, and the chip carries an application program that can implement the foregoing method procedure performed by a VIM. As shown in FIG. 15, the time correction apparatus includes a receiving unit 91, a conversion unit 92, and a sending unit 93.

The receiving unit 91 is configured to receive, after hot migration is performed on a first virtual machine, a virtual machine migration message sent by an NFVI. The virtual machine migration message includes an ID of the first virtual machine, and the ID of the first virtual machine is used to indicate that a to-be-corrected virtual machine is the first virtual machine.

The conversion unit 92 is configured to convert the virtual machine migration message into a hot migration notification message. The hot migration notification message includes the ID of the first virtual machine.

The sending unit 93 is configured to send the hot migration notification message to a VNFM, to instruct the VNFM to correct a system time of the first virtual machine using a service control VNF.

Further, the receiving unit 91 is configured to receive, using an Nf-Vi interface after hot migration is performed on the first virtual machine, the virtual machine migration message sent by the NFVI.

The sending unit 93 is configured to send the hot migration notification message to the VNFM using a Vi-Vnfm interface.

It should be noted that, for specific description of some function modules in the time correction apparatus provided in this embodiment of the present disclosure, reference may be made to corresponding content in the method embodiments, and details are not described herein in this embodiment.

After hot migration is performed on a first virtual machine, the time correction apparatus provided in this embodiment of the present disclosure can convert a virtual machine migration message that is from an NFVI into a hot migration notification message that includes an ID of the first virtual machine, and send the hot migration notification message to a VNFM, to instruct the VNFM to correct a system time of the first virtual machine using a service control VNF. In the prior art, the system time of the first virtual machine needs to be corrected after a checking period expires. By contrast, in a solution provided in this embodiment of the present disclosure, the hot migration notification message is sent to the VNFM, to instruct the VNFM to correct the system time of the first virtual machine using the service control VNF, that is, a first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 16:
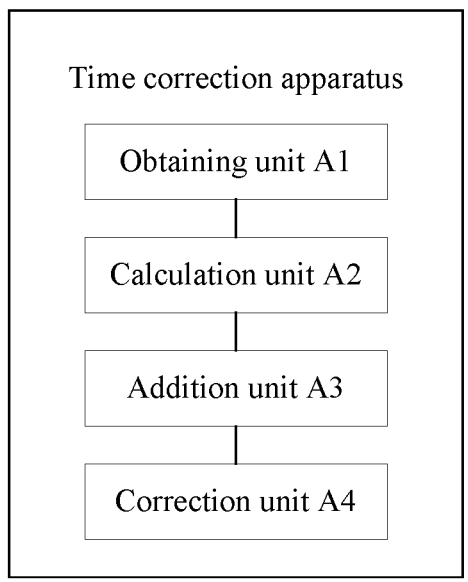
FIG. 16 is a schematic composition diagram of another time correction apparatus according to an embodiment of the present disclosure.

An embodiment of the present disclosure further provides a time correction apparatus that is applied to an NFV system. The time correction apparatus may be an entity apparatus/a virtual apparatus of the NFVI in the method embodiment shown in FIG. 7, or may be an entity apparatus that is in an NFV system and in which a logical function module that can perform a method procedure performed by an NFVI is located. The entity apparatus may be independently installed in an NFVI entity apparatus, or may be an entity apparatus that can communicate with an NFVI entity apparatus. The time correction apparatus may further be presented in a form of a chip, and the chip carries an application program that can implement the foregoing method procedure performed by an NFVI. As shown in FIG. 16, the time correction apparatus includes an obtaining unit A1, a calculation unit A2, an addition unit A3, and a correction unit A4.

The obtaining unit A1 is configured to obtain virtual machine suspension duration after hot migration is performed on a first virtual machine. The virtual machine suspension duration is duration in which the first virtual machine is not running in a hot migration process.

The obtaining unit A1 is further configured to obtain a clock rate of a CPU of the first virtual machine.

The calculation unit A2 is configured to calculate a count increased value of a TSC of the first virtual machine according to the clock rate of the CPU of the first virtual machine and the virtual machine suspension duration.

The addition unit A3 is configured to add the count increased value to a TSC count value of the first virtual machine.

The correction unit A4 is configured to use a value obtained after the adding as a new TSC count value of the first virtual machine.

Further, the calculation unit A2 is configured to calculate the count increased value according to the following formula:

Count increased value=Virtual machine suspension duration×Clock rate of the CPU of the first virtual machine/1000.

A unit of the virtual machine suspension duration is millisecond, and a unit of the clock rate of the CPU of the first virtual machine is hertz.

It should be noted that, for specific description of some function modules in the time correction apparatus provided in this embodiment of the present disclosure, reference may be made to corresponding content in the method embodiments, and details are not described herein in this embodiment.

The time correction apparatus provided in this embodiment of the present disclosure adds, to a TSC count value of a first virtual machine, a count increased value calculated according to a clock rate of a CPU of the first virtual machine and virtual machine suspension duration, and uses a value obtained after the adding as a new TSC count value of the first virtual machine. In this way, the virtual machine suspension duration is included when total duration of a service is subsequently calculated according to the new TSC count value. Therefore, charging deviation can be avoided during charging according to the calculated total duration of the service.

Figure 17:
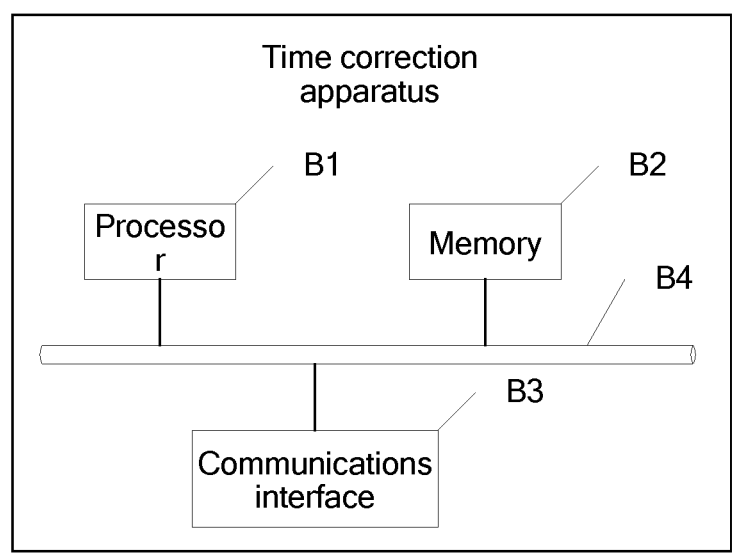
FIG. 17 is a schematic composition diagram of another time correction apparatus according to an embodiment of the present disclosure.

An embodiment of the present disclosure further provides a time correction apparatus that is applied to an NFV system. The time correction apparatus may be an entity apparatus of the VNFM in the method embodiment shown in FIG. 2, FIG. 5A and FIG. 5B, or FIG. 6A, FIG. 6B, and FIG. 6C, or may be an entity apparatus that can communicate with a VNFM entity apparatus. As shown in FIG. 17, the time correction apparatus may include a processor B1, a memory B2, a communications interface B3, and a system bus B4.

The processor B1, the memory B2, and the communications interface B3 are connected using the system bus B4 and communicate with each other using the system bus B4.

The processor B1 may be a CPU, or an application specific integrated circuit (ASIC), or one or more integrated circuits configured to implement this embodiment of the present disclosure.

The memory B2 may include a volatile memory, for example, a random access memory (RAM), or the memory B2 may include a non-volatile memory, for example, a read-only memory (ROM), a flash memory, a hard disk drive (HDD), or a solid-state drive (SSD), or the memory B2 may include a combination of the foregoing types of memories.

The communications interface B3 is configured to interact with another node, for example, interact with a VIM and a service control VNF.

The processor B1 is configured to execute program code stored in the memory B2, and is configured to receive, using the communications interface B3, a hot migration notification message sent by a VIM after hot migration is performed on a first virtual machine, where the hot migration notification message includes an ID of the first virtual machine, and the ID of the first virtual machine is used to indicate that a to-be-corrected virtual machine is the first virtual machine; search, according to the ID of the first virtual machine, for a correspondence that is between an ID of a virtual machine and an identity of a service control VNF and stored in the memory B2, to determine a first service control VNF, where an identity of the first service control VNF is corresponding to the ID of the first virtual machine; and send the hot migration notification message to the first service control VNF using the communications interface B3, where the hot migration notification message is used to instruct the first service control VNF to correct a system time of the first virtual machine.

The memory B2 is configured to store code of the hot migration notification message, code of the correspondence between an ID of a virtual machine and an identity of a service control VNF, and a software program that controls the processor B1 to complete the foregoing process.

Optionally, in a first case of this embodiment of the present disclosure, the hot migration notification message is used to instruct the first service control VNF to correct the system time of the first virtual machine according to a time of an NTP system time source.

Optionally, in a second case of this embodiment of the present disclosure, the hot migration notification message further includes virtual machine suspension duration, and the virtual machine suspension duration is duration in which the first virtual machine is not running in a hot migration process.

The hot migration notification message is used to instruct the first service control VNF to correct the system time of the first virtual machine according to the virtual machine suspension duration.

Optionally, in a third case of this embodiment of the present disclosure, the hot migration notification message further includes virtual machine suspension duration, and the virtual machine suspension duration is duration in which the first virtual machine is not running in a hot migration process.

The hot migration notification message is further used to instruct the first service control VNF to correct the system time of the first virtual machine according to a time of an NTP system time source, and correct the system time of the first virtual machine according to the virtual machine suspension duration when failing to correct the system time of the first virtual machine according to the time of the NTP system time source.

Further, the hot migration notification message further includes a virtual machine suspension start time, and the virtual machine suspension start time is a start time at which the first virtual machine stops running in the hot migration process.

Further, the communications interface B3 includes a Vi-Vnfm interface and a Ve-Vnfm interface.

Optionally, the processor B1 is configured to receive, using the Vi-Vnfm interface, the hot migration notification message sent by the VIM after hot migration is performed on the first virtual machine.

Optionally, the processor B1 is configured to send the hot migration notification message to the first service control VNF using the Ve-Vnfm interface.

It should be noted that, for specific description of some function modules in the time correction apparatus provided in this embodiment of the present disclosure, reference may be made to corresponding content in the method embodiments, and details are not described herein in this embodiment.

After hot migration is performed on a first virtual machine, the time correction apparatus provided in this embodiment of the present disclosure can forward, to a service control VNF (a first service control VNF) of the first virtual machine, a hot migration notification message that is from a VIM, to instruct the first service control VNF to correct a system time of the first virtual machine. In the prior art, the system time of the first virtual machine needs to be corrected after a checking period expires. By contrast, in a solution provided in this embodiment of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 18:
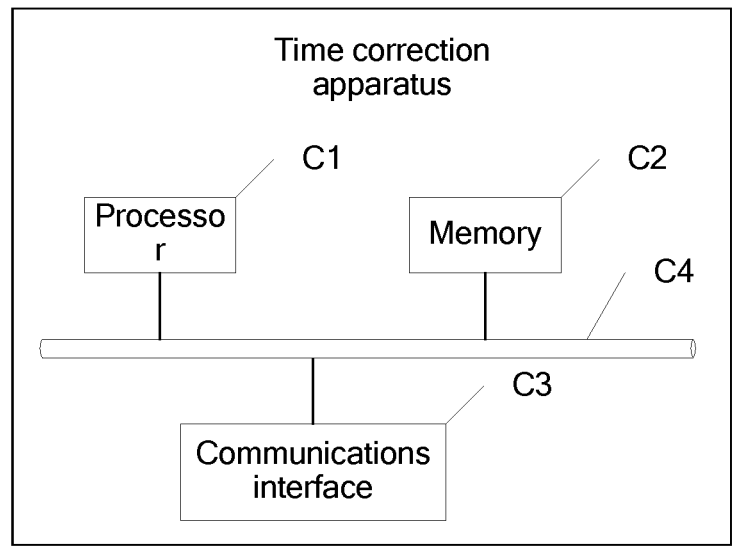
FIG. 18 is a schematic composition diagram of another time correction apparatus according to an embodiment of the present disclosure.

An embodiment of the present disclosure further provides a time correction apparatus that is applied to an NFV system. The time correction apparatus may be an entity apparatus of the first service control VNF in the method embodiment shown in FIG. 3, FIG. 5A and FIG. 5B, or FIG. 6A, FIG. 6B, and FIG. 6C, or may be an entity apparatus that can communicate with a first service control VNF entity apparatus. As shown in FIG. 18, the time correction apparatus includes a processor C1, a memory C2, a communications interface C3, and a system bus C4.

The processor C1, the memory C2, and the communications interface C3 are connected using the system bus C4 and communicate with each other using the system bus C4.

The processor C1 may be a CPU, or an ASIC, or one or more integrated circuits that are configured to implement this embodiment of the present disclosure.

The memory C2 may include a volatile memory, for example, a RAM, or the memory C2 may include a non-volatile memory, for example, a read-only memory ROM, a flash memory, an HDD, or an SSD, or the memory C2 may include a combination of the foregoing types of memories.

The communications interface C3 is configured to interact with another node, for example, interact with a VNFM.

The processor C1 is configured to execute program code stored in the memory C2, and is configured to receive, using the communications interface C3 after hot migration is performed on a first virtual machine, a hot migration notification message sent by a VNFM, where the hot migration notification message includes an ID of the first virtual machine, and the ID of the first virtual machine is used to indicate that a to-be-corrected virtual machine is the first virtual machine; and correct a system time of the first virtual machine.

The memory C2 is configured to store code of the hot migration notification message, and a software program that controls the processor C1 to complete the foregoing process.

Optionally, in a first case of this embodiment of the present disclosure, the processor C1 is further configured to obtain a time of an NTP system time source, and correct the system time of the first virtual machine to the time of the NTP system time source.

Optionally, in a second case of this embodiment of the present disclosure, the hot migration notification message further includes virtual machine suspension duration, and the virtual machine suspension duration is duration in which the first virtual machine is not running in a hot migration process.

The processor C1 is further configured to add the virtual machine suspension duration to the system time of the first virtual machine, and use a system time obtained after the adding as a new system time of the first virtual machine.

Optionally, in a third case of this embodiment of the present disclosure, the hot migration notification message further includes virtual machine suspension duration, and the virtual machine suspension duration is duration in which the first virtual machine is not running in a hot migration process.

The processor C1 is further configured to obtain a time of an NTP system time source, add the virtual machine suspension duration to the system time of the first virtual machine when failing to obtain the time of the NTP system time source, and use a system time obtained after the adding as a new system time of the first virtual machine.

Further, the hot migration notification message further includes a virtual machine suspension start time, and the virtual machine suspension start time is a start time at which the first virtual machine stops running in the hot migration process. The time correction apparatus is a call control VNF.

Further, the processor C1 is further configured to determine, according to the virtual machine suspension start time, a service that is not finished at the virtual machine suspension start time and has been finished by a time the hot migration notification message is received; obtain total duration of the service; add the virtual machine suspension duration to the total duration; and use duration obtained after the adding as new total duration of the service.

Further, the processor C1 is further configured to send a hot migration charging compensation message to a charging control VNF using the communications interface C3. The hot migration charging compensation message includes an identity of the service, the virtual machine suspension duration, and the virtual machine suspension start time, and the hot migration charging compensation message is used to instruct the charging control VNF to correct the total duration of the service and charge according to the corrected total duration of the service.

Further, the communications interface C3 includes a Ve-Vnfm interface.

The processor C1 is configured to receive, using the Ve-Vnfm interface after hot migration is performed on the first virtual machine, the hot migration notification message sent by the VNFM.

It should be noted that, for specific description of some function modules in the time correction apparatus provided in this embodiment of the present disclosure, reference may be made to corresponding content in the method embodiments, and details are not described herein in this embodiment.

After hot migration is performed on a first virtual machine, the time correction apparatus provided in this embodiment of the present disclosure can receive a hot migration notification message sent by a VNFM, and correct a system time of the first virtual machine. In the prior art, the system time of the first virtual machine needs to be corrected after a checking period expires. By contrast, in a solution provided in this embodiment of the present disclosure, the time correction apparatus may correct the system time of the first virtual machine according to an instruction of the hot migration notification message, that is, the time correction apparatus corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 19:
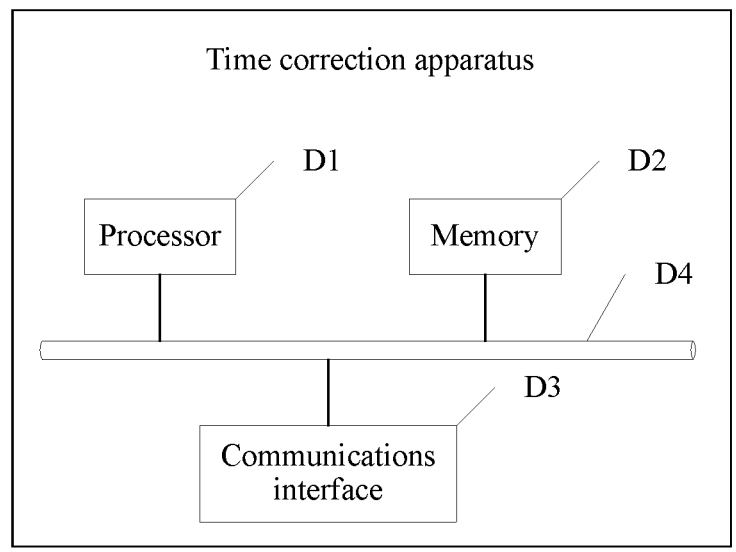
FIG. 19 is a schematic composition diagram of another time correction apparatus according to an embodiment of the present disclosure.

An embodiment of the present disclosure further provides a time correction apparatus that is applied to an NFV system. The time correction apparatus may be an entity apparatus of the VIM in the method embodiment shown in FIG. 4, FIG. 5A and FIG. 5B, or FIG. 6A, FIG. 6B, and FIG. 6C, or may be an entity apparatus that can communicate with a VIM entity apparatus. As shown in FIG. 19, the time correction apparatus includes a processor D1, a memory D2, a communications interface D3, and a system bus D4.

The processor D1, the memory D2, and the communications interface D3 are connected using the system bus D4 and communicate with each other using the system bus D4.

The processor D1 may be a CPU, or an ASIC, or one or more integrated circuits that are configured to implement this embodiment of the present disclosure.

The memory D2 may include a volatile memory, for example, a RAM, or the memory D2 may include a nonvolatile memory, for example, a read-only memory ROM, a flash memory, an HDD, or an SSD, or the memory D2 may include a combination of the foregoing types of memories.

The communications interface D3 is used to interact with another node, for example, interact with an NFVI and a VNFM.

The processor D1 is configured to execute program code stored in the memory D2, and is configured to receive, using the communications interface D3 after hot migration is performed on a first virtual machine, a virtual machine migration message sent by an NFVI, where the virtual machine migration message includes an ID of the first virtual machine, and the ID of the first virtual machine is used to indicate that a to-be-corrected virtual machine is the first virtual machine; convert the virtual machine migration message into a hot migration notification message, where the hot migration notification message includes the ID of the first virtual machine; and send the hot migration notification message to a VNFM using the communications interface D3, to instruct the VNFM to correct a system time of the first virtual machine using a service control VNF.

The memory D2 is configured to store code of the virtual machine migration message, code of the hot migration notification message, and a software program that controls the processor D1 to complete the foregoing process.

Further, the communications interface D3 includes an Nf-Vi interface and a Vi-Vnfm interface.

Optionally, the processor D1 is configured to receive, using the Nf-Vi interface after hot migration is performed on the first virtual machine, the virtual machine migration message sent by the NFVI.

Optionally, the processor D1 is configured to send the hot migration notification message to the VNFM using the Vi-Vnfm interface.

It should be noted that, for specific description of some function modules in the time correction apparatus provided in this embodiment of the present disclosure, reference may be made to corresponding content in the method embodiments, and details are not described herein in this embodiment.

After hot migration is performed on a first virtual machine, the time correction apparatus provided in this embodiment of the present disclosure can convert a virtual machine migration message that is from an NFVI into a hot migration notification message that includes an ID of the first virtual machine, and send the hot migration notification message to a VNFM, to instruct the VNFM to correct a system time of the first virtual machine using a service control VNF. In the prior art, the system time of the first virtual machine needs to be corrected after a checking period expires. By contrast, in a solution provided in this embodiment of the present disclosure, the hot migration notification message is sent to the VNFM, to instruct the VNFM to correct the system time of the first virtual machine using the service control VNF, that is, a first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

Figure 20:
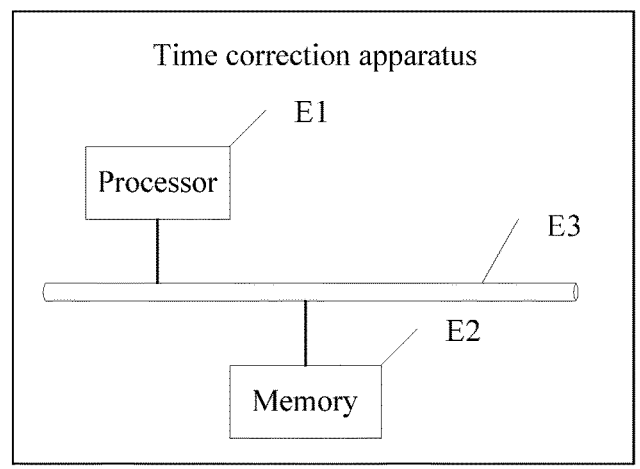
FIG. 20 is a schematic composition diagram of another time correction apparatus according to an embodiment of the present disclosure.

An embodiment of the present disclosure further provides a time correction apparatus that is applied to an NFV system. The time correction apparatus may be an entity apparatus of the NFVI in the method embodiment shown in FIG. 7, or may be an entity apparatus that can communicate with an NFVI entity apparatus. As shown in FIG. 20, the time correction apparatus includes a processor E1, a memory E2, and a system bus E3.

The processor E1 and the memory E2 are connected using the system bus E3 and communicate with each other using the system bus E3.

The processor E1 may be a CPU, or an ASIC, or one or more integrated circuits that are configured to implement this embodiment of the present disclosure.

The memory E2 may include a volatile memory, for example, a RAM, or the memory E2 may include a non-volatile memory, for example, a read-only memory ROM, a flash memory, an HDD, or an SSD, or the memory E2 may include a combination of the foregoing types of memories.

The processor E1 is configured to execute program code stored in the memory E2, and is configured to obtain virtual machine suspension duration after hot migration is performed on a first virtual machine, where the virtual machine suspension duration is duration in which the first virtual machine is not running in a hot migration process; obtain a clock rate of a CPU of the first virtual machine; calculate a count increased value of a TSC of the first virtual machine according to the clock rate of the CPU of the first virtual machine and the virtual machine suspension duration; add the count increased value to a TSC count value of the first virtual machine; and use a value obtained after the adding as a new TSC count value of the first virtual machine.

Further, the processor E1 is configured to calculate the count increased value according to the following formula:

Count increased value=Virtual machine suspension duration×Clock rate of the CPU of the first virtual machine/1000.

A unit of the virtual machine suspension duration is millisecond, and a unit of the clock rate of the CPU of the first virtual machine is hertz.

The memory E2 is configured to store code of the formula used for calculating the count increased value, and a software program that controls the processor E1 to complete the foregoing process.

It should be noted that, for specific description of some function modules in the time correction apparatus provided in this embodiment of the present disclosure, reference may be made to corresponding content in the method embodiments, and details are not described herein in this embodiment.

The time correction apparatus provided in this embodiment of the present disclosure adds, to a TSC count value of a first virtual machine, a count increased value calculated according to a clock rate of a CPU of the first virtual machine and virtual machine suspension duration, and uses a value obtained after the adding as a new TSC count value of the first virtual machine. In this way, the virtual machine suspension duration is included when total duration of a service is subsequently calculated according to the new TSC count value. Therefore, charging deviation can be avoided during charging according to the calculated total duration of the service.

Figure 21:
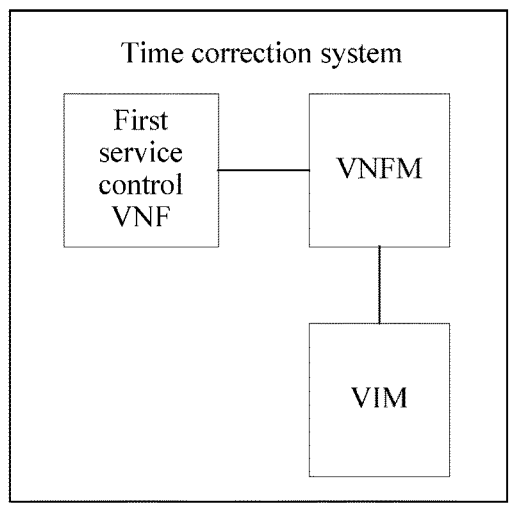
FIG. 21 is a schematic composition diagram of a time correction system according to an embodiment of the present disclosure.

An embodiment of the present disclosure further provides a time correction system. In a first case, as shown in FIG. 21, the time correction system includes the time correction apparatus shown in FIG. 8, any one of the time correction apparatuses shown in FIG. 9 to FIG. 14, and the time correction apparatus shown in FIG. 15; or the time correction system includes the time correction apparatus shown in FIG. 17, the time correction apparatus shown in FIG. 18, and the time correction apparatus shown in FIG. 19.

Figure 22:
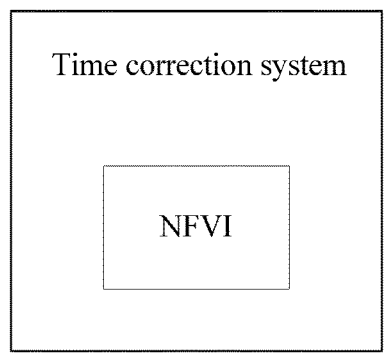
FIG. 22 is a schematic composition diagram of another time correction system according to an embodiment of the present disclosure.

In a second case, as shown in FIG. 22, the time correction system includes the time correction apparatus shown in FIG. 16; or the time correction system includes the time correction apparatus shown in FIG. 20.

The time correction apparatuses shown in FIG. 8 and FIG. 17 may be referred to as a VNFM, any one of the time correction apparatuses shown in FIG. 9 to FIG. 14 and the time correction apparatus shown in FIG. 18 may be referred to as a first service control VNF, the time correction apparatuses shown in FIG. 15 and FIG. 19 may be referred to as a VIM, and the time correction apparatuses shown in FIG. 16 and FIG. 20 may be referred to as an NFVI.

It may be understood that a VNFM in the time correction system provided in this embodiment of the present disclosure may perform the time correction method shown in FIG. 2, FIG. 5A and FIG. 5B, or FIG. 6A, FIG. 6B, and FIG. 6C; a first service control VNF in the time correction system provided in this embodiment of the present disclosure may perform the time correction method shown in FIG. 3, FIG. 5A and FIG. 5B, or FIG. 6A, FIG. 6B, and FIG. 6C; a VIM in the time correction system provided in this embodiment of the present disclosure may perform the time correction method shown in FIG. 4, FIG. 5A and FIG. 5B, or FIG. 6A, FIG. 6B, and FIG. 6C; and an NFVI in the time correction system provided in this embodiment of the present disclosure may perform the time correction method shown in FIG. 7. Details are not described herein in this embodiment of the present disclosure.

In the time correction system provided in this embodiment of the present disclosure, after hot migration is performed on a first virtual machine, a VNFM forwards, to a service control VNF (a first service control VNF) of the first virtual machine, a hot migration notification message that is from a VIM, to instruct the first service control VNF to correct a system time of the first virtual machine. In the prior art, the system time of the first virtual machine needs to be corrected after a checking period expires. By contrast, in a solution provided in this embodiment of the present disclosure, the first service control VNF may correct the system time of the first virtual machine according to an instruction of the hot migration notification message, that is, the first service control VNF corrects the time when receiving the hot migration notification message, and does not need to wait until a checking period expires. Therefore, a prior-art problem that after hot migration is performed on the first virtual machine, a service depending on the system time of the first virtual machine is affected due to an excessively long checking period can be resolved. In this solution, the system time of the first virtual machine can be corrected in time, so as to ensure that the service depending on the system time of the first virtual machine is not affected.

The foregoing descriptions about implementation manners allow persons skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in another manner. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A time correction method, applied to a network functions virtualization (NFV) system, wherein the time correction method comprises:
   receiving, by a virtualized network function manager (VNFM), a hot migration notification message from a virtualized infrastructure manager (VIM) after hot migration is performed on a first virtual machine, wherein the hot migration notification message comprises an identity (ID) of the first virtual machine, and wherein the ID of the first virtual machine is used to indicate that a to-be-corrected virtual machine is the first virtual machine;
   searching, by the VNFM according to the ID of the first virtual machine, for a correspondence between an ID of a virtual machine and an identity of a service control virtualized network function (VNF) and stored in the VNFM in order to determine a first service control VNF, wherein an identity of the first service control VNF corresponds to the ID of the first virtual machine; and
   sending, by the VNFM, the hot migration notification message to the first service control VNF, wherein the hot migration notification message is used to instruct the first service control VNF to correct a system time of the first virtual machine.

2. The time correction method according to claim 1, wherein the hot migration notification message is used to instruct the first service control VNF to correct the system time of the first virtual machine according to a time of a Network Time Protocol (NTP) system time source.

3. The time correction method according to claim 1, wherein the hot migration notification message further comprises virtual machine suspension duration, wherein the virtual machine suspension duration is duration in which the first virtual machine is not running in a hot migration process, and wherein the hot migration notification message is used to instruct the first service control VNF to correct the system time of the first virtual machine according to the virtual machine suspension duration.

4. The time correction method according to claim 2, wherein the hot migration notification message further comprises virtual machine suspension duration, wherein the virtual machine suspension duration is duration in which the first virtual machine is not running in a hot migration process, and wherein the hot migration notification message is further used to instruct the first service control VNF to:
   correct the system time of the first virtual machine according to the time of the NTP system time source; and
   correct the system time of the first virtual machine according to the virtual machine suspension duration when failing to correct the system time of the first virtual machine according to the time of the NTP system time source.

5. The time correction method according to claim 4, wherein the hot migration notification message further comprises a virtual machine suspension start time, and wherein the virtual machine suspension start time is a start time at which the first virtual machine stops running in the hot migration process.

6. The time correction method according to claim 1, wherein receiving the hot migration notification message from the VIM after the hot migration is performed on the first virtual machine comprises receiving, by the VNFM using a Vi-Vnfm interface, the hot migration notification message from the VIM after the hot migration is performed on the first virtual machine, and wherein sending the hot migration notification message to the first service control VNF comprises sending, by the VNFM, the hot migration notification message to the first service control VNF using a Ve-Vnfm interface.

7. A time correction method, applied to a network functions virtualization (NFV) system, wherein the time correction method comprises:
   receiving, by a first service control virtualized network function (VNF) after hot migration is performed on a first virtual machine, a hot migration notification message from a virtualized network function manager (VNFM), wherein the first service control VNF is a service control VNF of the first virtual machine, wherein the hot migration notification message comprises an identity (ID) of the first virtual machine, and wherein the ID of the first virtual machine is used to indicate that a to-be-corrected virtual machine is the first virtual machine; and
   correcting, by the first service control VNF, a system time of the first virtual machine.

8. The time correction method according to claim 7, wherein correcting the system time of the first virtual machine comprises:
   obtaining, by the first service control VNF, a time of a Network Time Protocol (NTP) system time source; and
   correcting the system time of the first virtual machine to the time of the NTP system time source.

9. The time correction method according to claim 7, wherein the hot migration notification message further comprises virtual machine suspension duration, wherein the virtual machine suspension duration is duration in which the first virtual machine is not running in a hot migration process, and wherein correcting the system time of the first virtual machine comprises:
   adding, by the first service control VNF, the virtual machine suspension duration to the system time of the first virtual machine; and
   using a system time obtained after the adding as a new system time of the first virtual machine.

10. The time correction method according to claim 7, wherein the hot migration notification message further comprises virtual machine suspension duration, wherein the virtual machine suspension duration is duration in which the first virtual machine is not running in a hot migration process, and wherein correcting the system time of the first virtual machine comprises:
   obtaining, by the first service control VNF, a time of an NTP system time source;
   adding, by the first service control VNF, the virtual machine suspension duration to the system time of the first virtual machine when the first service control VNF fails to obtain the time of the NTP system time source; and
   using a system time obtained after the adding as a new system time of the first virtual machine.

11. A time correction apparatus, applied to a network functions virtualization (NFV) system, wherein the time correction apparatus comprises:
   a receiver configured to receive a hot migration notification message from a virtualized infrastructure manager (VIM) after hot migration is performed on a first virtual machine, wherein the hot migration notification message comprises an identity (ID) of the first virtual machine, and wherein the ID of the first virtual machine is used to indicate that a to-be-corrected virtual machine is the first virtual machine;
   a processor coupled to the receiver and configured to search, according to the ID of the first virtual machine, for a correspondence between an ID of a virtual machine and an identity of a service control virtualized network function (VNF) and stored in a virtualized network function manager (VNFM) in order to determine a first service control VNF, wherein an identity of the first service control VNF corresponds to the ID of the first virtual machine; and
   a transmitter coupled to the processor and configured to send the hot migration notification message to the first service control VNF, wherein the hot migration notification message is used to instruct the first service control VNF to correct a system time of the first virtual machine.

12. The time correction apparatus according to claim 11, wherein the hot migration notification message is used to instruct the first service control VNF to correct the system time of the first virtual machine according to a time of a Network Time Protocol (NTP) system time source.

13. The time correction apparatus according to claim 11, wherein the hot migration notification message further comprises virtual machine suspension duration, wherein the virtual machine suspension duration is duration in which the first virtual machine is not running in a hot migration process, and wherein the hot migration notification message is used to instruct the first service control VNF to correct the system time of the first virtual machine according to the virtual machine suspension duration.

14. The time correction apparatus according to claim 12, wherein the hot migration notification message further comprises virtual machine suspension duration, wherein the virtual machine suspension duration is duration in which the first virtual machine is not running in a hot migration process, and wherein the hot migration notification message is further used to instruct the first service control VNF to:
   correct the system time of the first virtual machine according to the time of the NTP system time source; and correct the system time of the first virtual machine according to the virtual machine suspension duration when failing to correct the system time of the first virtual machine according to the time of the NTP system time source.

15. The time correction apparatus according to claim 14, wherein the hot migration notification message further comprises a virtual machine suspension start time, and wherein the virtual machine suspension start time is a start time at which the first virtual machine stops running in the hot migration process.

16. The time correction apparatus according to claim 11, wherein the receiver is configured to receive, using a Vi-Vnfm interface, the hot migration notification message from the VIM after the hot migration is performed on the first virtual machine, and wherein the transmitter is further configured to send the hot migration notification message to the first service control VNF using a Ve-Vnfm interface.

17. A time correction apparatus, applied to a network functions virtualization (NFV) system, wherein the time correction apparatus comprises:
   a receiver configured to receive, after hot migration is performed on a first virtual machine, a hot migration notification message from a virtualized network function manager (VNFM), wherein the hot migration notification message comprises an identity (ID) of the first virtual machine, and the ID of the first virtual machine is used to indicate that a to-be-corrected virtual machine is the first virtual machine; and
   a processor coupled to the receiver and configured to correct a system time of the first virtual machine.

18. The time correction apparatus according to claim 17, wherein the processor is further configured to:
   obtain a time of a Network Time Protocol (NTP) system time source; and
   correct the system time of the first virtual machine to the time of the NTP system time source.

19. The time correction apparatus according to claim 17, wherein the hot migration notification message further comprises virtual machine suspension duration, wherein the virtual machine suspension duration is duration in which the first virtual machine is not running in a hot migration process, and wherein the processor is further configured to:
   add the virtual machine suspension duration to the system time of the first virtual machine; and
   use a system time obtained after the adding as a new system time of the first virtual machine.

20. The time correction apparatus according to claim 17, wherein the hot migration notification message further comprises virtual machine suspension duration, wherein the virtual machine suspension duration is duration in which the first virtual machine is not running in a hot migration process, and wherein the processor is further configured to:
   add the virtual machine suspension duration to the system time of the first virtual machine when the processor fails to obtain a time of an NTP system time source; and
   use a system time obtained after the adding as a new system time of the first virtual machine.

* * * * *